(12) United States Patent
Murtha et al.

(10) Patent No.: US 7,197,562 B2
(45) Date of Patent: Mar. 27, 2007

(54) PROJECTOR DEVICE MANAGEMENT SYSTEM

(75) Inventors: Steve Murtha, Portland, OR (US); De Tran, Portland, OR (US); Jim Wenban, Wilsonville, OR (US); Alan Cossitt, Beaverton, OR (US); Joe Castaldi, West Linn, OR (US)

(73) Assignee: InFocus Corporation, Wilsonville, OR (US)

( * ) Notice: Subject to any disclaimer, the term of this patent is extended or adjusted under 35 U.S.C. 154(b) by 677 days.

(21) Appl. No.: 10/194,334

(22) Filed: Jul. 11, 2002

(65) Prior Publication Data

US 2003/0191836 A1 Oct. 9, 2003

Related U.S. Application Data

(60) Provisional application No. 60/370,704, filed on Apr. 5, 2002.

(51) Int. Cl.
*G06F 15/16* (2006.01)
*G06F 15/177* (2006.01)
*G06F 15/173* (2006.01)

(52) U.S. Cl. ............... 709/224; 709/220; 709/217
(58) Field of Classification Search ........ 709/217–226; 715/736
See application file for complete search history.

(56) References Cited

U.S. PATENT DOCUMENTS

| | | | |
|---|---|---|---|
| 6,216,158 B1* | 4/2001 | Luo et al. .............. 709/217 |
| 6,282,175 B1 | 8/2001 | Steele et al. |
| 6,359,711 B1 | 3/2002 | Cole et al. |
| 6,418,469 B1* | 7/2002 | Justice, Jr. et al. ......... 709/224 |
| 6,499,062 B1* | 12/2002 | Shteyn ....................... 719/315 |
| 6,532,491 B1* | 3/2003 | Lakis et al. ................ 709/223 |
| 6,560,637 B1* | 5/2003 | Dunlap et al. ............. 709/204 |
| 6,735,616 B1* | 5/2004 | Thompson et al. ......... 709/204 |
| 6,751,661 B1* | 6/2004 | Geddes ...................... 709/223 |
| 6,785,015 B1* | 8/2004 | Smith et al. ............... 358/1.15 |
| 6,842,800 B2* | 1/2005 | Dupont ....................... 710/52 |
| 6,944,659 B2* | 9/2005 | Taggart et al. ............. 709/224 |
| 6,947,994 B1* | 9/2005 | Kraslavsky ................ 709/230 |
| 7,024,476 B1* | 4/2006 | Page et al. .................. 709/224 |
| 7,028,304 B1* | 4/2006 | Weinberger et al. ........ 719/310 |
| 7,059,722 B2 | 6/2006 | Matoba et al. |
| 2001/0044840 A1 | 11/2001 | Carleton |
| 2002/0032764 A1* | 3/2002 | Ishikawa et al. ............ 709/223 |
| 2002/0143908 A1* | 10/2002 | Taggart et al. ............. 709/223 |
| 2003/0028637 A1* | 2/2003 | Gross ......................... 709/225 |
| 2003/0065766 A1* | 4/2003 | Parry ......................... 709/224 |

* cited by examiner

*Primary Examiner*—David Wiley
*Assistant Examiner*—Joseph E. Avellino
(74) *Attorney, Agent, or Firm*—Alleman Hall McCoy Russell & Tuttle LLP

(57) ABSTRACT

A system and methods for managing a plurality of projector devices over a computer network are provided. The system includes a projector manager linked to a computer network, wherein the projector manager is configured to monitor over the network a status of a selected feature of a selected projector device, and to change the status of the selected feature when requested. The system also includes a projector manager controller linked to the computer network, wherein the projector manager controller is configured to request the projector manager to perform at least one of the functions of reporting the status of the selected feature and requesting the selected projector device to change the status of the selected feature.

35 Claims, 12 Drawing Sheets

Fig. 8

LOW LAMP LIFE EVENT PROPERTIES  [?] [X]

GENERAL

EVENT TYPE
TYPE: LOW LAMP LIFE EVENT
DESCRIPTION: PROJECTOR LAMP LIFE HAS EXCEEDED SPECIFIED THRESHOLD

NOTIFICATION
☑ ENABLE E-MAIL NOTIFICATION
E-MAIL ADDRESS: USER@COMPANY.COM

EVENT PARAMETERS
NOTIFY WHEN REMAINING LAMP LIFE HOURS LESS THAN [20]

[OK] [CANCEL] [APPLY]

Fig. 9

LAMP LIFE EVENT NOTIFICATION  [?] [X]

GENERAL

EVENT TYPE
| | |
|---|---|
| TYPE: | LAMP LIFE THRESHOLD |
| DATE OCCURRED | MM/DD/YYYY |
| PROJECTOR MODEL | MODEL B |
| LOCATION | ROOM A |
| DESCRIPTION | LOW LAMP LIFE EVENT. THE LAMP HAS AN ESTIMATED REMAINING LIFE OF 20 HOURS (2%) |

EVENT STATUS
☐ EVENT HAS BEEN HANDLED

[OK] [CANCEL] [APPLY]

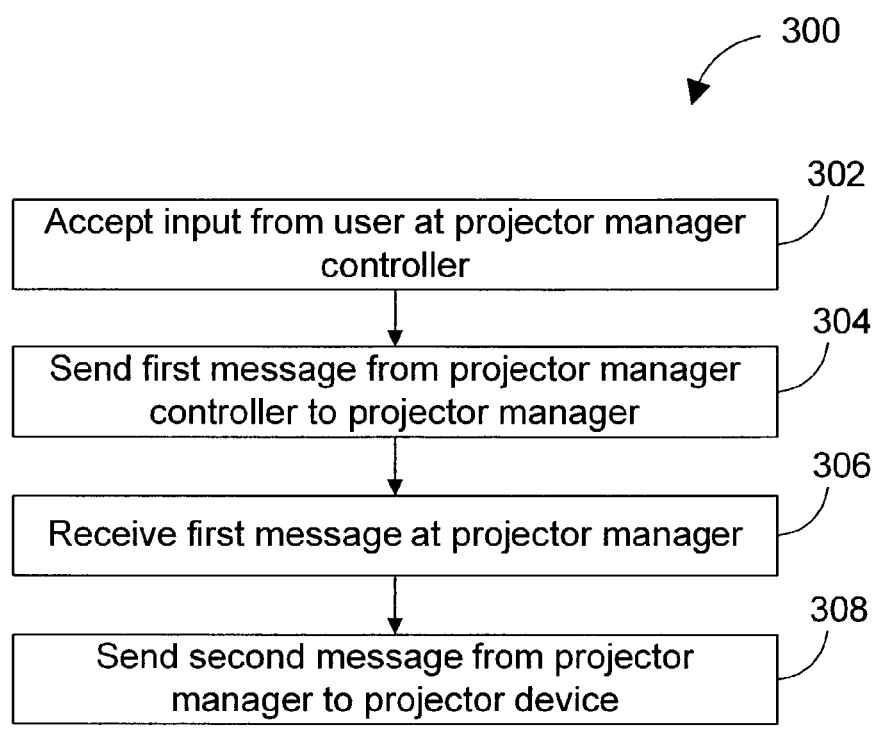
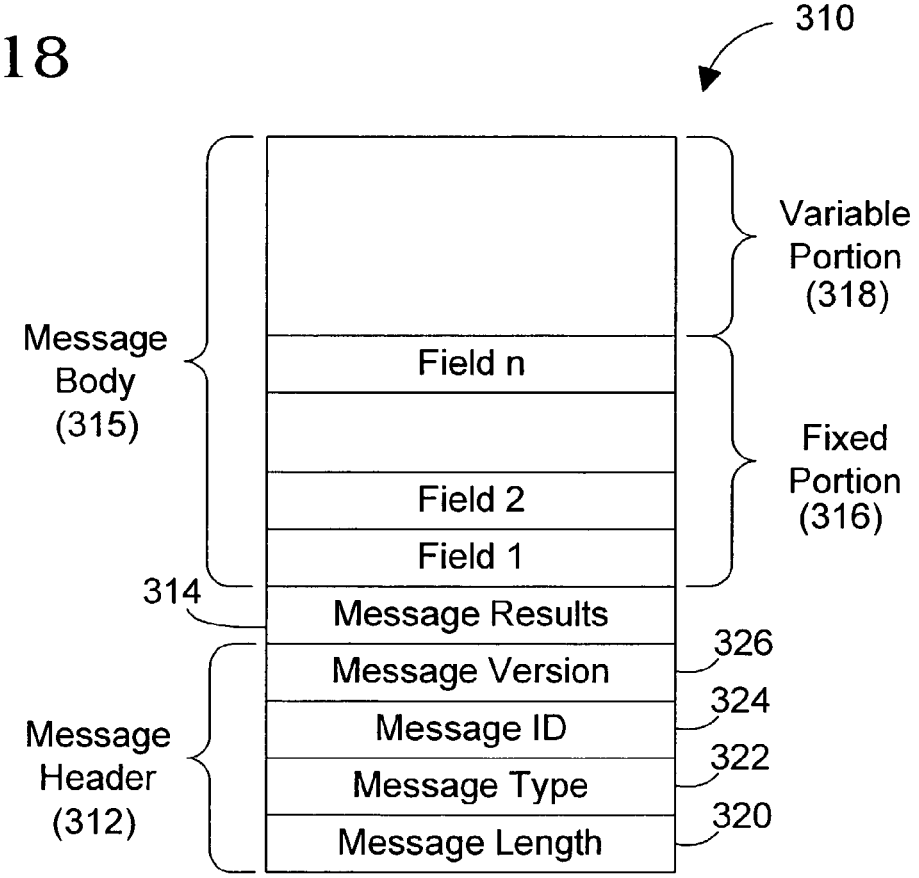

PROJECTOR DEVICE MANAGEMENT SYSTEM

CROSS-REFERENCE TO RELATED APPLICATIONS

This application claims priority from U.S. Provisional Patent Application Ser. No. 60/370,704 of Steve Murtha, De Tran, James D. Wenban, Alan Cossitt, and Joe Castaldi for a SYSTEM AND METHOD FOR CONTROLLING A PROJECTOR OVER A NETWORK, filed Apr. 5, 2002, the disclosure of which is hereby incorporated by reference.

TECHNICAL FIELD

The present invention relates a system for managing a plurality of projector devices over a network.

BACKGROUND OF THE INVENTION

In recent years, projector devices, such as digital projectors, have found increased popularity as a tool for the presentation of content to an audience. These projector devices are typically used to project a computer-generated presentation onto a viewing surface, and allow a user to easily present high-quality, professional appearing images to audiences of a range of sizes. As a result, these projector devices are now often found as permanent fixtures in conference rooms and other meeting facilities.

Some entities, such as businesses and schools, may have a plurality of projector devices installed multiple physical locations, for example, in different conference rooms, different buildings, or even different cities, states and/or countries. The administration of such an arrangement of projector devices may be a difficult and time-consuming task. For example, it may be difficult to keep track of whether the lamps on all the projector devices are functional, or whether any projector devices have been stolen or moved. Such problems may cause significant delays to a user who wishes to use a selected projector device if not remedied ahead of time. However, manually checking each projector device at regular enough intervals to ensure reliable operation may take a significant amount of employee time.

Similar problems may arise regarding administrative control of a plurality of projector devices. For example, where the ability to change projector device settings is not restricted, a later user of a selected projector device may have to change the settings left by a prior user before presenting content with the projector device. Furthermore, a user may forget to turn a projector device off, thus effectively reducing the life of the projector device lamp.

SUMMARY OF THE INVENTION

One aspect of the present invention provides a system for managing a plurality of network-enabled projector devices over a computer network. The system includes a projector manager linked to a computer network, wherein the projector manager is configured to monitor over the network a status of a selected feature of a selected projector device, and to change the status of the selected feature when requested. The system also includes a projector manager controller linked to the computer network, wherein the projector manager controller is configured to request the projector manager to perform at least one of the functions of reporting the status of the selected feature and requesting the selected projector device to change the status of the selected feature.

Another aspect of the present invention provides a system for administrating a plurality of projector devices over a computer network. The system includes server software stored on a recordable medium linked to the network, wherein the server software is executable by a server computing device to communicate with a selected projector device over the network to detect a status of the selected projector device and to change the status of the selected projector device when directed, and administrative client software stored on a recordable medium linked to the network, wherein the administrative client software is executable by a client computing device to permit the user to direct the server computing device to communicate with the selected projector device.

Yet another aspect of the present invention provides a method for remotely controlling a network-enabled projector device, wherein the projector device is connected to a computer network that includes a client computing device and a server computing device. The method includes sending a first message from the client computing device to the server computing device directing the server to request the projector device to perform a selected function, and upon receiving the first message at the server computing device, sending a second message from the server computing device to the projector device requesting the projector device to perform the selected function.

A further aspect of the present invention provides a method of automatically alerting of a changed state of a projector device linked to a computer network, the network including a server computing device in communication with the projector device over the network and a client computing device in communication with the server computing device over the network. The method comprises detecting a current state of the projector device via the server computing device, comparing the current state of the projector device with a preselected condition, and if the current state of the projector device meets the preselected condition, then sending a message from the server computing device to the client computing device to alert of the current state of the projector device.

BRIEF DESCRIPTION OF THE DRAWINGS

FIG. 8 is a view of an exemplary event notification configuration sub-screen of the embodiment of FIG. 3.

FIG. 9 is a view of an exemplary event description sub-screen of the embodiment of FIG. 3.

FIG. 17 is a flow diagram of a method of remotely controlling a network-enabled projector device according to an embodiment of the present invention.

FIG. 18 is a block diagram of an exemplary message format suitable for use with the embodiment of FIG. 17.

DETAILED DESCRIPTION OF THE PREFERRED EMBODIMENTS

Figure 1:
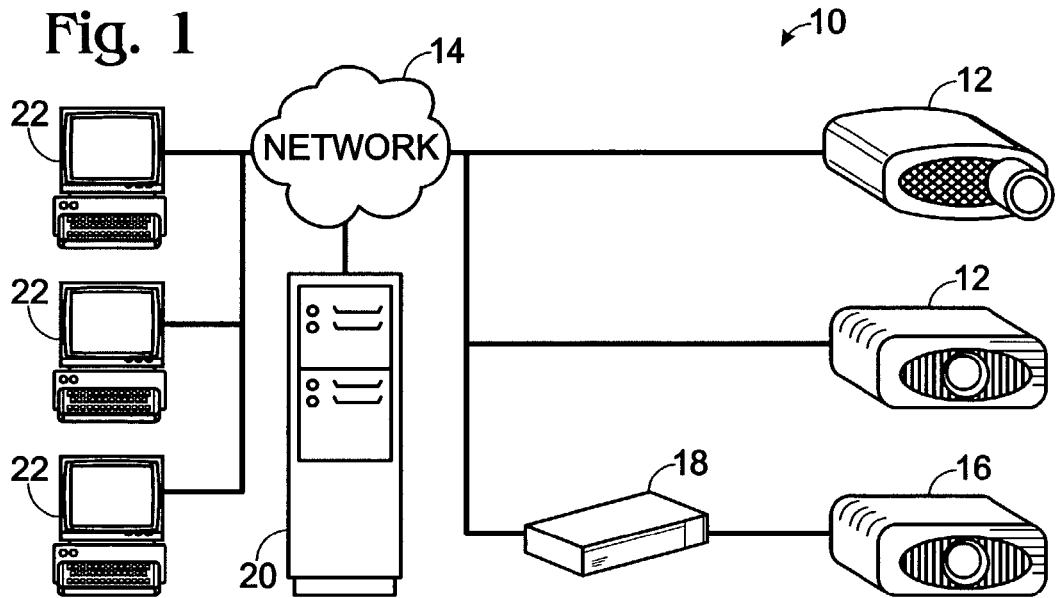
FIG. 1 is a schematic depiction of an exemplary embodiment of a projector device management system according to the present invention.

One embodiment of a projector device management system according to the present invention is shown generally at 10 in FIG. 1 as a plurality of network-enabled projector devices 12, 16 connected to a computer network 14. Some projector devices 12 may have built-in networking capabilities that allow them to communicate directly over network 14 with other network devices. Other projector devices, as illustrated at 16, may be may not have built-in networking capabilities. In this case, projector device 16 may be connected to network 14 via a network adaptor device 18 disposed between the projector device and the network that enables the projector device to communicate over the network. Examples of suitable adaptor devices 18 include, but are not limited to, hardware adaptor devices available from the Lantronix Corporation, such as the Lantronix UDS-10 network adaptor, and software adaptors, such as the Win32 Client and the C13 Client, both for personal computers (PCs) running a Microsoft Windows operating system.

A server computing device 20 is also connected to network 14. Server computing device 20 includes software, firmware and/or hardware configured to communicate with projector devices 12 and 16 to allow the projector devices to be controlled, monitored and managed from a remote location. For example, server computing device 20 may be configured to poll each projector device 12, 16 for information regarding the current status of each projector device, and to store the most recent status information from each projector device so that a user can access the most recent status information of a selected projector device at will. Furthermore, server computing device 20 may be configured to allow the status of some projector device features and/or functions to be changed over the network.

Server computing device 20 may be configured to allow the monitoring and/or change of the status of any suitable projector device feature or function over network 14. Examples of features that may be both monitored and changed over network 14 include, but are not limited to, the status of a power switch (on/off), current image source, whether the projector device is configured for ceiling- or table-mounting, and whether the projector device is configured to be in rear projection mode. Examples of features that may be monitored, but not necessarily changed, over network 14 include, but are not limited to, remaining lamp hours, status of the projector device cooling fan (operational/not operational), projector device temperature (below threshold/above threshold), projector device model name, projector device firmware revision number, and projector device serial number.

Besides allowing the status of various projector device functions to be monitored, server computing device 20 may also be configured to send an alert to another network device whenever a change in a selected status is detected. For example, if server computing device 20 polls a projector device for its status and finds that the projector device lamp has burned out, the server computing device may send a message to another network device to alert a selected user or administrator of the change in lamp status. Likewise, if server computing device 20 is unable to establish a connection with a selected projector device, indicating that the selected projector device is no longer connected to the network, the server computing device may send a message to another network device to alert the selected user or administrator that the projector device has been disconnected from the network, or possibly stolen.

System 10 also includes one or more client computing devices 22. Three client computing devices 22 are shown in the depicted embodiment. Client computing devices 22 are configured to allow users to interact with server computing device 20 to manage projector devices 12 and 16 from locations remote from the server computing device. Moreover, the use of client computing devices 22 allows more than one user at a time to interact with server computing device 20.

Figure 2:
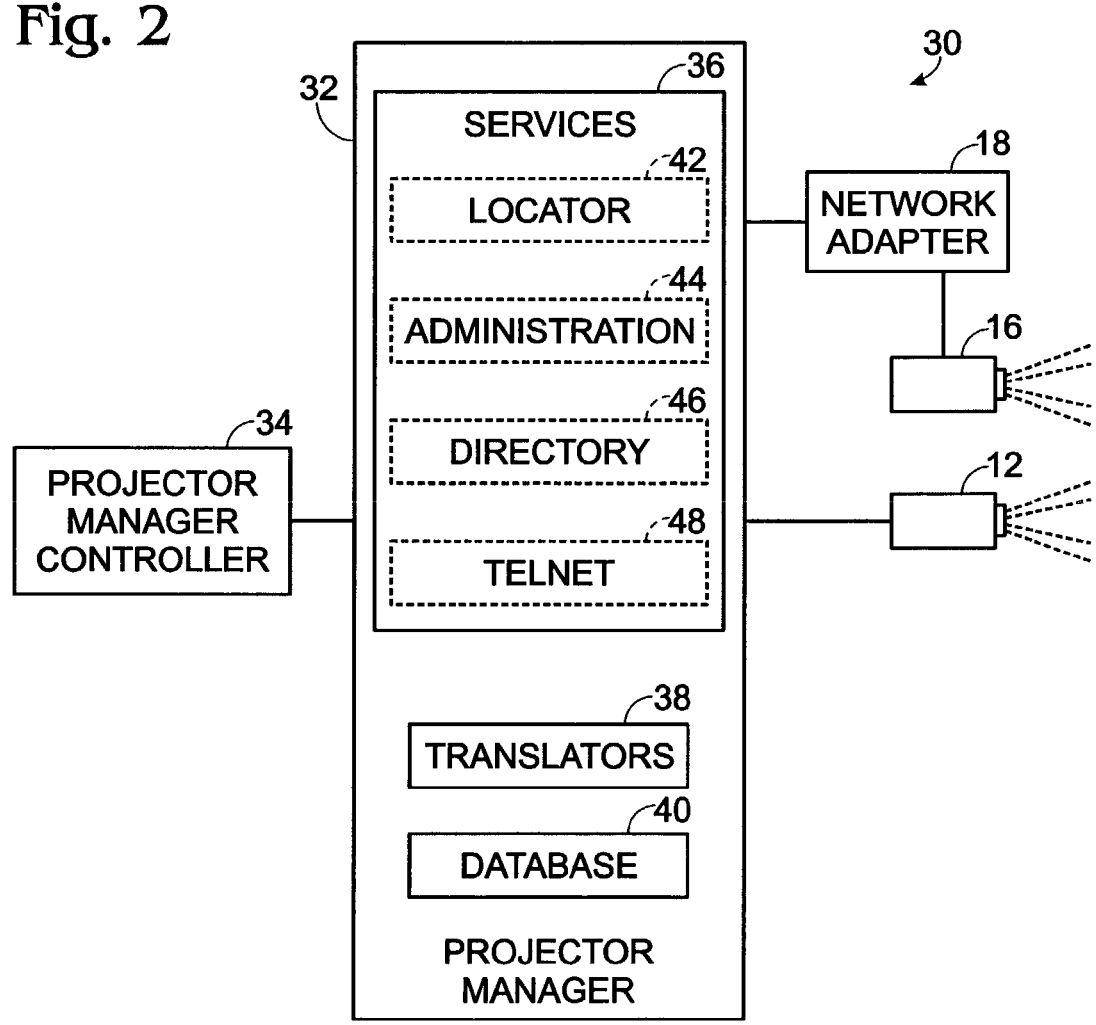
FIG. 2 is a block diagram of the projector device management system of FIG. 1.

FIG. 2 shows generally at 30 a block diagram of an exemplary architecture of a projector management system according to the present invention. System 30 includes a projector manager 32, typically implemented as software on server computing device 20, configured to interact with a projector manager controller 34, which is typically implemented as software on client computing devices 22. Projector manager 32 is also configured to interact with software in network adaptor 18 and network-enabled projector devices 12 to perform any desired projector device management tasks, including, but not limited to, the monitoring and control functions listed above. This is described in more detail below. While only two projector devices are shown connected to projector manager 32 in the depicted embodiment, any other desired number of projector devices, and typically all projector devices within an entity, may be connected to the projector manager.

Projector manager 32 may have any suitable architecture for interacting in a desired manner with projector manager controller 34, projector devices 12 and 16, and network adaptor 18. One example of a suitable architecture is shown in FIG. 2. In the depicted embodiment, projector manager 32 includes three major components: a set of services 36 configured to perform the functional aspects of projector management, a set of translators 38 to translate queries and commands sent from the projector manager to projector devices that utilize a command language different than that of projector manager 32, and a database 40 to store information related to the projector devices, approved users, etc. It will be appreciated that the term "service" as used herein denotes a program or process that performs a certain function, and may have any desired form and operate in any desired operating environment. For example, services 36 of the present invention, when implemented in the environment of a Microsoft WINDOWS NT operating system, may take the form of NT services, which are executables that communicate and interface with the NT operating system in a known manner.

The various processes that are used to interact with the projector devices, network adaptors and projector manager controller 34 are organized into four services 36 in the exemplary architecture of FIG. 2. These four services may be described as a "locator" service 42, an "administration" service 44, a "directory" service 46 and a "telnet" service 48.

Locator service 42 is responsible for locating various "resources" on the system, such as the other services and, indirectly, any projector devices 12, 16 connected to projector manager 32. Locator service 42 thus may serve as the central communications controller for projector management system 30. Locator service 42 also may be configured to keep track of registered users and store their access rights, typically in database 40. Thus, locator service 42 also may be configured to control the logon function of projector manager 32, and to prevent unregistered users from gaining access to the projector manager.

Locator service 42 allows all components in projector management system 30 to be configured with a single "reference point" (for example, a DNS/WINS computer name or static IP address), regardless of how many devices or servers are connected to the projector management system. Thus, in a large entity with many projector devices, more than one administration service 44 may be run on different server computing devices, and locator service 42 may direct different projector devices 12, 16, network adaptors 18, and/or projector manager controllers 34 to the different administration services for the most efficient use of system resources. Likewise, more than one directory service 46 and telnet service 48 may also be run on different server computing devices.

The use of multiple server computing devices running multiple administration services 44 may offer various advantages in some situations. Some examples are as follows. First, where the number of projector devices within an entity is large (for example, 100+), locator service 42 may be configured to divide the projector load between two or more administration services 44 on separate server computing devices. This load balancing function may be performed either dynamically or statically based upon network attributes such as IP subnet, etc. Second, in an entity with multiple physical locations, the installation of an administration service 44 at each physical site may help to minimize network traffic between sites. In this manner, a projector device 12 or network adaptor 18 may query locator service 42 to determine which administration service 44 to use, after which all communication between that projector device or network adaptor and its corresponding administration service may occur within the same site. Third, in a multiple administration service implementation, user privileges may be assigned on a per server basis. This may allow one individual to monitor projector devices in one building while another monitors projector devices in another building. Similarly, a network administrator could limit the access of selected users to one or more specific servers.

Administration service 44 may be configured to perform functions related to the administrative aspects of projector device management. For example, administration service 44 may be configured to poll projector devices 12, 16 to determine their current state, to set projector device parameters when directed by a user, and to implement features that are automatically performed in the background, for example, auto-shutdown and theft detection routines. Administration service 44 may also be configured to synthesize projector device "events." A projector device event is a condition, such as the reported bulb life reaching or exceeding a predetermined threshold, that requires action or intervention by a user. Administration service 44 may maintain a log of events for review at the user's convenience. Administration service 44 may also send an email notification of some or all events for more immediate response.

Directory service 46 may be configured to perform functions related to keeping track of the physical location of all resources. The information within directory service 46 may be organized in any desired fashion. For example, directory service 46 may allow a user to build a database of conference rooms within an entity's facilities. This database may have a "flat" structure, in the form of a simple list of rooms, or may have a hierarchical structure, with location objects such as country, city, campus, building and/or floor. This allows the formation of a geographical reference for a projector device. Thus, administration service 44 may identify a networked projector device by its IP and/or MAC address, while directory service 46 allows the networked projector device to be labeled with a geographical reference. The implementation of directory service 46 as a separate service from administration service 44 may allow the implementation of scheduling capabilities that allow individual users with low privilege levels to request and/or reserve a specified projector device in a desired conference room at a specified time.

Telnet service 48 may be configured to communicate with projector devices 12, 16 and/or network adaptors 18 that communicate via telnet protocols. Telnet service 48 may be configured to perform these functions either on its own, or in cooperation with administration service 44.

Translators 38 are configured to translate commands and/or queries from services 36 into the native command language or languages for each of projector devices 12 and 16, and network adaptor 18, and to translate responses from the projector devices and network adaptor into the command language utilized by the services. Translators 38 may be configured to communicate with projector manager 32 in any desired language. One exemplary language in which translators 38 may communicate with services 36 is PCML, or projector control markup language, an XML-based language described in U.S. patent application Ser. No. 60/370,878 of James D. Wenban and Robin F. Hoeye for a Projector Control Markup Language, filed simultaneously with this application, the disclosure of which is hereby incorporated by reference. While the translators of the depicted embodiment are shown as being part of projector manager 32, translators may instead be provided within projector devices 12, 16 and/or network adaptor 18, or as a separate component at any suitable point(s) along the communication path(s) between services 36 and the projector devices and network adaptor. It will be appreciated that some projector devices may be configured to utilize the same command language as projector manager 32, and that in these instances the projector device and projector manager may communicate without the use of a translator.

Database 40 is configured to store information related to projector devices and registered users. The use of database 40 to store user and projector device information may offer several advantages over other data storage systems. For example, projector devices 12 and 16 may not always be on-line. Storing the last polled state of each projector device allows the configuration of a selected projector device to be examined even if the selected projector device cannot be directly queried. Furthermore, the use of database 40 allows information regarding the projector devices to be easily updated, and information regarding new projector device models to be easily added.

Projector manager controller 34 provides an interface with which a user may communicate with projector manager 32. Projector manager controller 34 interacts with each service 36, and may be responsible for obtaining data from each service 36 and combining this data into an integrated view of the entire system for the user. Thus, where system 30 utilizes an IP network, each projector manager controller 34 running (typically one per client computing device) maintains an active TCP/IP connection with each service 36. Projector manager controller 34 may have any suitable form that provides for these capabilities. For example, where projector manager 32 is configured to operate within a WINDOWS NT operating system, projector manager controller 34 may take the form of an MMC (Microsoft Management Console) snap-in. In this implementation, the snap-in may be distributed to all users on a network who may be involved in the management of network projector devices in some capacity. This may allow multiple users to run projector manager controller 34 and connect to projector manager 32 at the same time. Likewise, projector manager controller 34 may utilize an active web page on which a user may enter commands. Such a system may be suitable for use on a wider range of operating systems, for example, UNIX- or LINUX-based systems.

Projector manager controller 34 may be configured to support multiple user privilege levels, wherein each privilege level allows a user at that privilege level to perform a different subset of functions to projector devices 12, 16. One exemplary scheme of privilege levels is as follows. A primary administrator of projector device management system 30 may need access to all functions of projector manager controller 34 to have the capability to fully manage the projector device management system. Thus, a first, or "administration," privilege level, could be defined that allows a primary administrator to access and perform all available functions of projector manager controller 34.

In some entities, more than one person may be responsible for administrating the entity's projector devices. Thus, there may be one or more secondary administrators. Through the use of a second, somewhat narrower "facilities" privilege level, these secondary administrators may be allowed to perform all of the functions of projector manager controller 34 that go to the management of projector devices, while being denied the ability to perform functions related to managing users and/or configuring projector manager 32.

Besides the two administrative privilege levels, an even more limited "help desk" privilege level may be provided for users who may wish to have the ability to access a more limited set of functions of projector manager controller 34. The "help desk" privilege level may allow a user to perform simple functions related to the operation of selected projector devices, such as turning a projector device off or on, but restrict the user from performing any administrative tasks.

The various functions that may be performed on projector manager 32 and projector devices 12, 16 may be grouped into the various privilege levels in any desired manner. Table I gives an exemplary list of some possible functions of projector manager controller 34, and an exemplary privilege level assignment for each. It will be understood that the functions and grouping of functions within each privilege group is merely exemplary, and that the functions may have any other suitable privilege assignments.

TABLE I

| Administrative Function | Privilege Group |
| --- | --- |
| Add and/or remove servers | Administration |
| Configure IP addresses, server names, TCP/IP ports | Administration |
| View current server status | Administration |
| Add and remove users | Administration |
| Set user privileges | Administration |
| Import and view projector device model information | Facilities |
| Set projector device location | Facilities |
| Remove projector device from server database | Facilities |
| Set event definition parameters (including e-mail address) | Facilities |
| View event log and delete entries | Facilities |
| Add, remove, and edit Directory information | Facilities |
| View current projector device list with projector device status information | Facilities |
| Monitor projector device status in real time | Help Desk |
| Update projector device setting, including power, input source, etc. | Help Desk |

Figure 3:
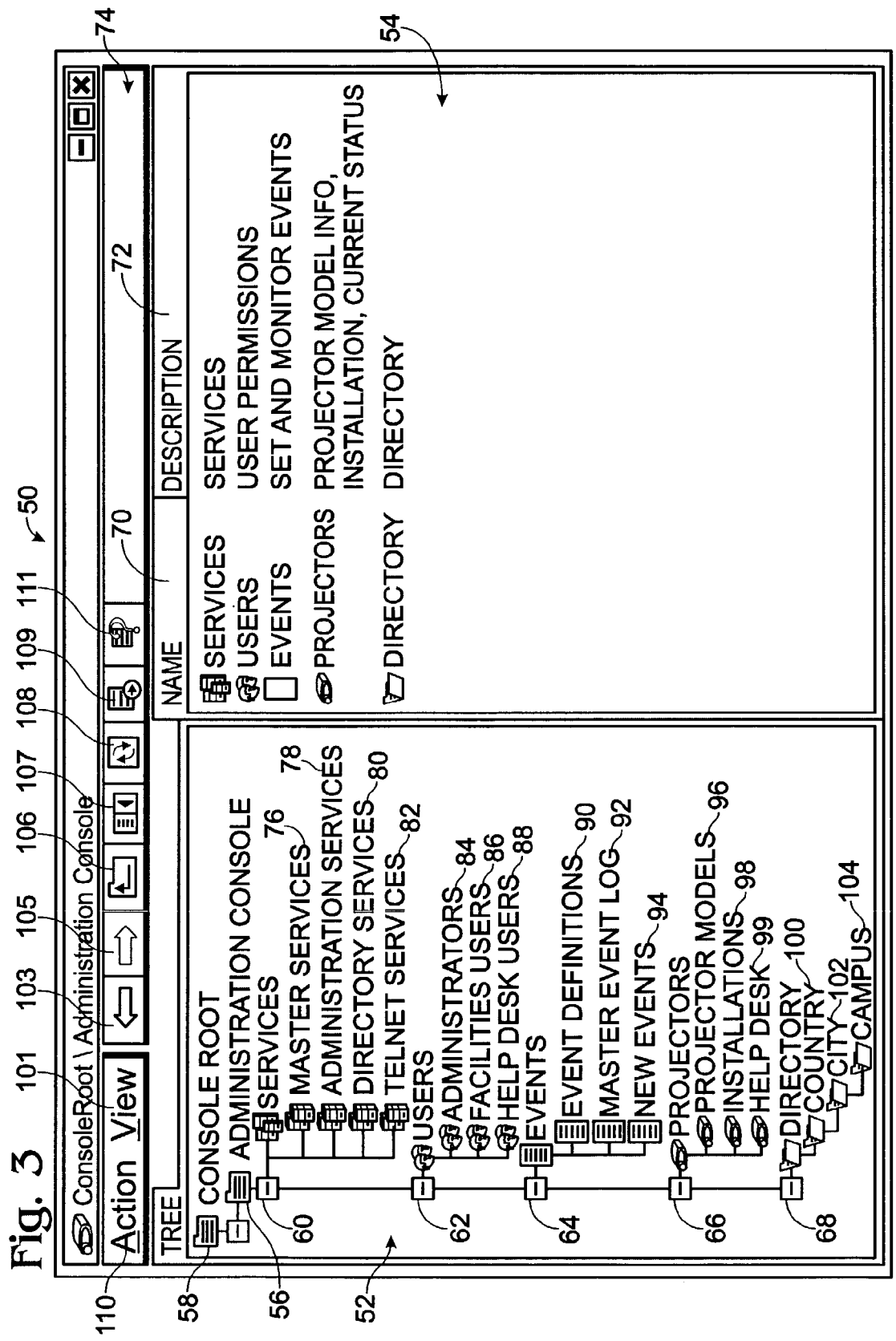
FIG. 3 is a view of an exemplary user interface of a projector manager controller according to an embodiment of the present invention.

As mentioned above, where projector manager 32 is configured to operate within a WINDOWS NT operating system, projector manager controller 34 may take the form of an MMC (Microsoft Management Console) snap-in. FIG. 3 shows, generally at 50, an exemplary user interface for an MMC-implemented projector manager controller. Interface 50 includes a left-side window 52 that displays the overall architecture of projector manager controller 34 in the form of a hierarchical series of nodes which are selectable via an input device, such as a mouse, and a right-side window 54 that displays the sub-notes that are located within a selected node.

Interface 50 may also include a tool bar 55 with controls that allow quick access to some commonly selected functions. For example, tool bar 55 may include a "view" control 101 that allows a user to customize the format of the arrangement and/or appearance of icons in left side window 52 and right side window 54. User interface 50 may also include a "back" control 103 to move back one selection, a "forward" control 105 to go forward one selection, an "up" icon 106 to go up to the next highest node, a show/hide console tree icon 107 for revealing or hiding the console tree in left side window 52, a refresh icon 108 for refreshing the information displayed by user interface 50, an export icon 109 for exporting information from user interface 50 into an external file, and a help icon 111 that opens a help screen. While the user interface is depicted in the context of an MMC interface, it will be appreciated that the user interface may have any other suitable form. Examples of other suitable user interfaces include, but are not limited to, a Web-based interface in which a set of web pages may be used to present the same information that is depicted herein in the MMC context. The use of a Web-based interface may allow user interface 50 to be used with a larger set of operating systems than an MMC-based interface.

Referring to left-side window 52, all nodes relating to the administration of projector devices 12, 16 are located in a single "administration console" node 56 underneath a root console node 58. In the depicted embodiment, administration console node 56 and root console node are labeled "console" to signify that it corresponds to a console file (a preselected set of MMC snap-in files) being run by the MMC application. However, root node 56 may have any other suitable label.

Administration console root node 56 is the node under which all functions and features of projector manager controller 34 are organized. A plurality of nodes may be provided under administration console root node 56 to help organize the various functions and features of projector manager controller 34. In the depicted embodiment, interface 50 includes a "services" node 60, a "users" node 62, an "events" node 64, a "projectors" node 66, and a "directory" node 68.

Selection of services node 60 in left-side window 52 causes the names of each service to appear in right-side window 54. When services node 60 is selected, the names of the services appear under a "names" heading 70 in right-side window 54, and a brief legend describing the purpose and/or contents of each service may also appear under a "description" heading 72 in right-side window 54. Names heading 70 and description heading 72 appear in a general headings section 74 of right-side window 54. Headings besides names heading 70 and description heading 72 may appear in general headings section 74 which may display different headings depending upon the node being displayed.

One or more sub-nodes may be located beneath services node 60. In the depicted embodiment, one sub-node for each service appears beneath services node 60. "Master services" sub-node 76 corresponds to locator service 42, "administration services" sub-node 78 corresponds to the administration service 44, "directory services" sub-node 80 corresponds to directory service 46, and "telnet services" sub-node 82 corresponds to telnet service 48. Selection of any of these service sub-nodes results in the display of information about that particular service in right-side window 54. Examples of information that could be displayed about each service include, but are not limited to, the machine name of the server on which the selected service is located, and whether the service is currently running or is stopped. While one sub-node for each service appears under services node 60, either more or fewer sub-nodes may appear here, depending upon how the user interface is organized.

Users node 62 also may have a plurality of sub-nodes. In the depicted embodiment, users node 62 has a sub-node for each user privilege group: an "administrators" sub-node 84, a "facilities users" sub-node 86, and a "help-desk users" sub-node 88. Selection of any of sub-nodes 84, 86 or 88 may result in the identification of individuals registered with that particular privilege level in right side window 54.

Events node 64 may include one or more sub-nodes that are selectable to display a corresponding list of events in right side window 54. Events may be organized under events node 64 in any desired manner. In the depicted embodiment, events node 64 includes an "event definitions" sub-node 90, a "master event log" sub-node 92, and a "new events" sub-node 94. Selection of event definitions sub-node 90 may result in the display in right side window 54 of the types of event notifications supported by projector manager 32 and the email address to be contacted for an occurrence of each event. Examples of some events that may be supported include, but are not limited to, bulb life threshold, projector device theft (triggered when projector manager 32 is no longer able to communicate with a selected projector device), high temperature, clogged fan, and the receipt of a diagnostic code indicating an internal error condition from a projector device.

Master events log contains a list of all events, both new and old, that have occurred to the projection devices installed on system 30 that have not yet been deleted from the log. Selection of master event log sub-node 92 may be configured to display the complete log, or any desired subset of events. For example, master event log may be configured to display a list of all events that have occurred over a selected time period, or events that occurred only when e-mail notification was active. Events in master event log sub-node 92 may be configured to remain in the log until deleted by a user, or may be configured to be automatically deleted, for example, after the expiration of a selected time period. Furthermore, the events in listed master event log sub-node 92 may be configured to be viewable by location, event, type, date, or any other desired field to provide easy access to the data.

Whereas selection of master event log sub-node 92 typically results in the display of a list containing both new and old events, selection of new events sub-node 94 may be configured to result in the display of a log of new events that have not yet been attended to by an administrator. The list of events may include such information as the time an event occurred, the projector device on which the event occurred, the location of the projector device, and a description of the event. New events sub-node 94 may be configured to retain event notifications in the log until acted upon by an administrator, as described in more detail below.

Next, projectors node 66 may include one or more sub-nodes in which information regarding the projector devices may be accessed. Information regarding the projector devices may be organized in any desired manner. In the depicted embodiment, projectors node 66 includes a "projector models" sub-node 96, an "installations" sub-node 98, and a "help-desk users" sub-node 99. Selection of projector models sub-node 96 may be configured to result in the display of a list of projector models supported by projector manager 32, and may also be configured to result in the display of various information related to each projector model, including, but not limited to, the rated lamp life of each available projector device, the projector device and internal asset number, the hardware version, whether the projector device can be configured for ceiling mount and/or rear projection, whether the projector device supports excessive temperature reporting, filter change notification, the sending of diagnostic codes to projector manager 32, disconnect reporting, and/or theft detection. The information related to each projector device model is typically configured to be read-only so that users can only view data for a specific projector device model. This information may be stored in files that can be periodically updated to support new projector device models.

Selection of installations sub-node 98 may be configured to result in the display of a list of all projector devices that are installed on system 30. A projector device may then be selected from the displayed list to view information about the selected projector device. The information regarding individual projector devices that is displayed under installations sub-node 98 may be entered by a user, or may be "discovered" by projector manager 32 when a new projector device is connected to system 30 if the new projector device is configured to announce its presence on the system upon connection to the system. Any desired information regarding a projector device may be displayed upon selecting a projector device from the displayed list. Examples of projector device information include, but are not limited to, the projector device's location, model information, current operating parameters (bulb life, input source, etc.), and asset data.

Selection of help-desk users sub-node 99 may be configured to display similar information as the selection of installations sub-node 98, but typically displays a more limited sub-set of information restricted to the information to which access is allowed by users with a help-desk privilege level. An example of information regarding a selected projector device that may be displayed upon selection of help-desk users sub-node 99 includes information regarding whether the projector device power is on or off, a current input source, and whether a projector device is configured for table- or ceiling-mounted use. Likewise, information that is more administrative in nature, such as information regarding projector device bulb life, firmware version, serial number, etc. may be restricted from view under help-desk users sub-node 99.

Selection of directory node 68 may be configured to result in the display of one or more organizational sub-nodes that allow the location of a selected projector device to be found based upon the physical location of the selected projector device. Thus, an administrator may view the properties of a projector device by locating within the directory node the conference room in which the projector device is kept. The sub-nodes of directory node 68 may be organized in any desired manner. In the depicted embodiment, directory node 68 includes sub-nodes arranged in a geographical manner, with a top "country" sub-node 100, an intermediate "city" sub-node 102, and a lower "campus" sub-node 104. This structure may allow an administrator to quickly and easily locate and manage a projector device in a different country, city, or on a different campus.

As described above, selection of each node or sub-node displayed within user interface 50 results in the display of various information related to the selected node or sub-node. User interface 50 may also be configured to allow various functions to be performed within each node and sub-node. In the depicted embodiment, functions may be performed via the selection of an "action" control 110. Operation of action control 110 may result in the opening of a pull-down menu (or other selection interface) that lists one or more actions related to the selected sub-node that may be performed. For example, operation of action control 110 while administration console node 56 is selected may open a sub-screen or dialog box that shows the machine name and/or IP or other network address of the locator service and the TCP/IP port used by the locator service, and also may allow these values to be changed and exported.

Figure 4:
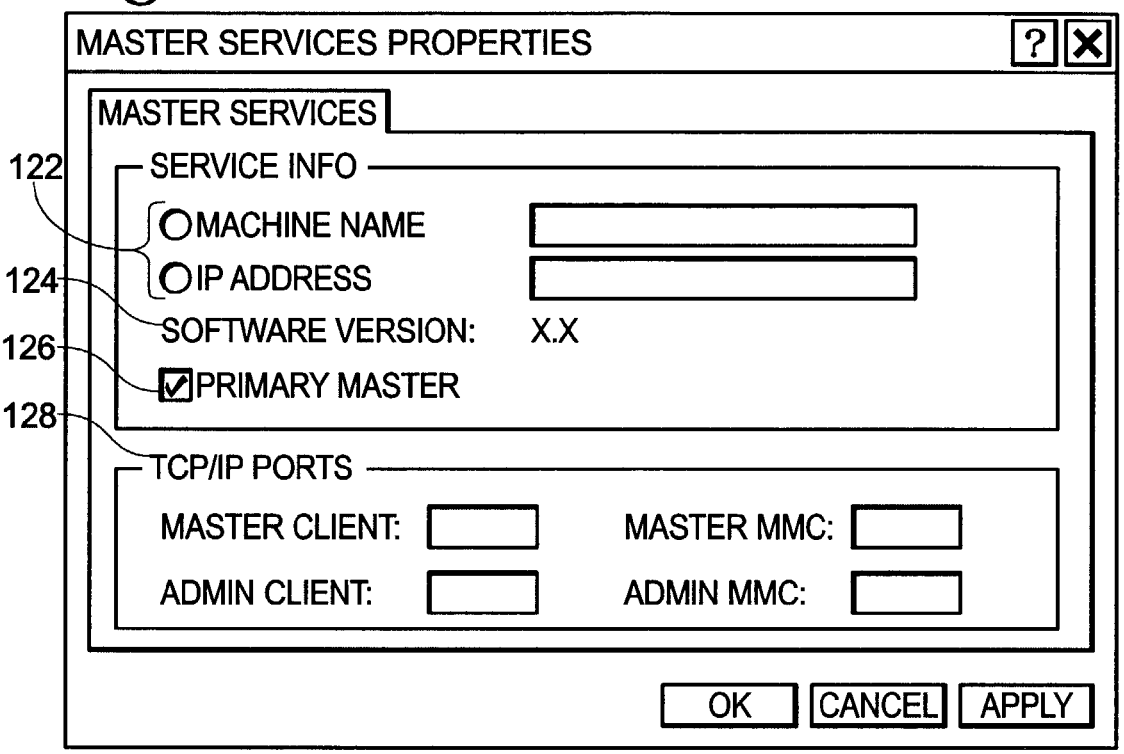
FIG. 4 is a view of an exemplary master services sub-screen of the embodiment of FIG. 3.

Operation of action control 110 while master services sub-node 76 is selected may be configured to open a dialog box that allows the location of locator service 42 to be displayed and/or set. An example of a suitable dialog box to allow control of locator service 42 is shown at 120 in FIG. 4 as a "master services properties" dialog box. Master services properties dialog box 120 includes a locator service address field 122 that allows the locator service location to be specified either by machine name or by IP address. Master services properties dialog box 120 also may include a software version field 124 that is automatically updated with software updates, and, where more than one locator service is in use, a selection box 126 that allows a user to select which locator service is the primary locator service. Master services properties dialog box 120 may also include fields allowing TCP/IP ports to be selected for various functions. In the depicted embodiment, the "master client" field allows a TCP/IP port to be selected for communication between a projector device and locator service 42, the "admin client" field allows a port to be selected for communication between the projector device and admin service 44, the "master MMC" field allows a port to be selected for communication between projector manager controller 34 (here, in the form of an MMC plug-in) and the locator service, and the "admin MMC" field allows a port to be selected for communication between the projector manager controller and the admin service.

Figure 5:
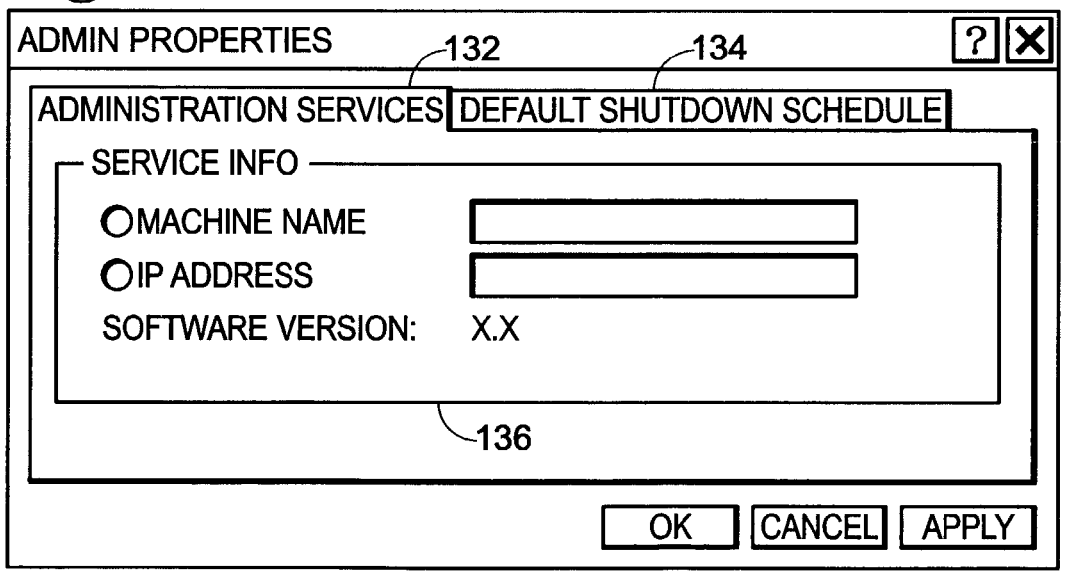
FIG. 5 is a view of an exemplary administration service sub-screen of the embodiment of FIG. 3.

Under some sub-nodes, more than one action may be available when action control 110 is operated. For example, operation of action control 110 while administration services sub-node 78 (FIG. 3) is selected may allow a user to select the IP and/or machine name address for administration service 44, and perform functions related to the administration of all projector devices connected to projector manager 32. An example of a suitable dialog box that allows both of these functions to be performed is shown generally in FIG. 5 at 130 as an "admin properties" dialog box. Admin properties dialog box 130 includes an administration service tab 132 and a default shutdown schedule tab 134. Selection of the administration service tab brings an administration services sub-dialog box 136 forward, thus allowing selection of the machine name and/or IP address of the machine on which the administration services is to reside. The administration services sub-dialog box 136 may also show other information related to the administration services, including, but not limited to, the current administration service 44 software version.

Figure 6:
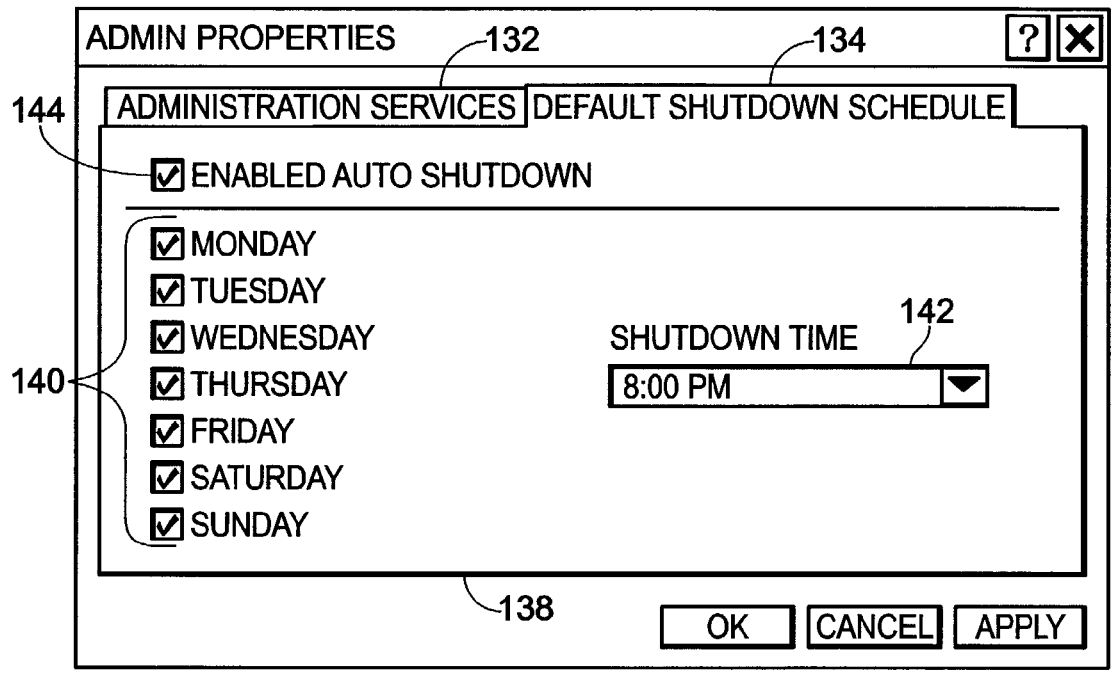
FIG. 6 is a view of an exemplary default shutdown scheduling sub-screen of the embodiment of FIG. 3.

On the other hand, selection of default shutdown schedule tab 134 on admin properties dialog box 130 brings a default shutdown schedule sub-dialog box 138 forward, as shown in FIG. 6. In the exemplary dialog box 138, default shutdown schedule sub-dialog box 138 allows a default shutdown time for all of the projector devices on system 30 to be set by the day of the week via selection of desired default shutdown days from day-of-the-week (or month, etc.) field 140, and selection of a desired shutdown time from time-selection pull-down menu 142. The auto shutdown feature to be enabled or disabled by selecting "enable" box 144. The selected default shutdown schedule may be overridden by setting a default shutdown schedule for individual projector devices within projectors node 66, as described in more detail below.

The auto shutdown feature may be configured to shut down a projector device only once during a shutdown period. For example, if the selected shutdown time is 8 PM every day and the projector device is polled at 8:01 PM, the projector device will be shut down. However, if the projector device is manually turned on at 8:05 PM and is again polled at 8:06 PM, it will not be shutdown until 8:00 PM the next day.

Figure 7:
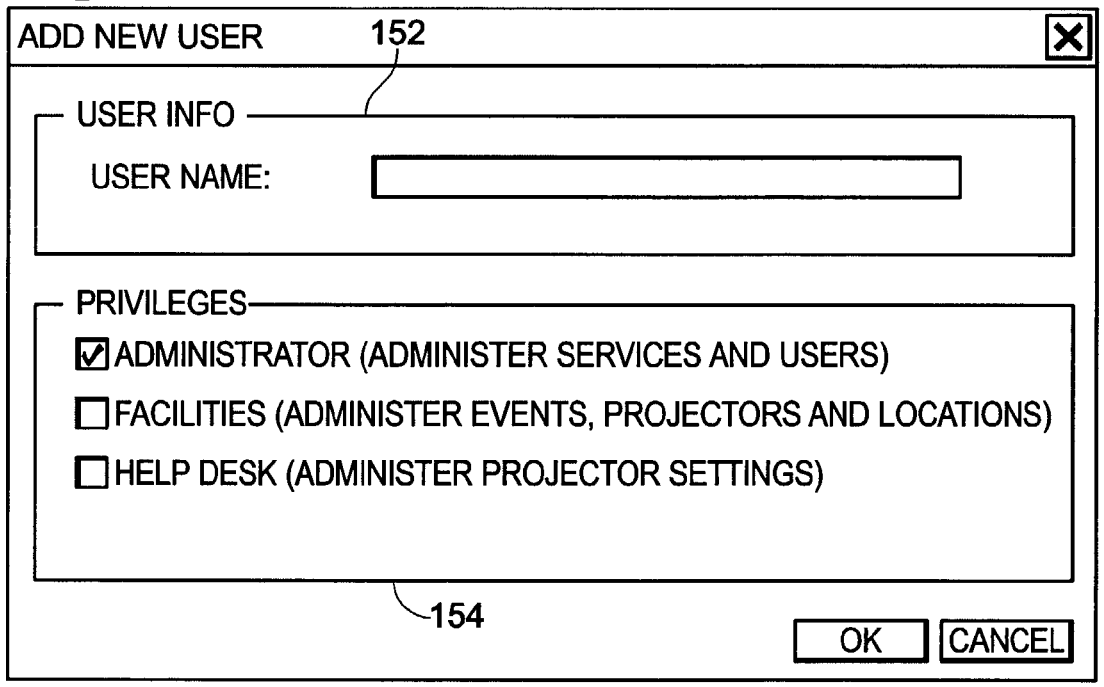
FIG. 7 is a view of an exemplary new user addition sub-screen of the embodiment of FIG. 3.

When users node 62 is selected in left side window 52 (FIG. 3), operation of action control 110 allows properties related to the users to be changed. For example, action control 110 may allow a dialog box for adding a new user, as shown generally at 150 in FIG. 7, to be opened. New user dialog box 150 may include a "user info" field 152 for entering the name of a new user, and a "privileges" field 154 for selecting the privilege level of a new user. Operation of action control 110 while any of the users sub-nodes 84, 86 or 88 is selected may be configured to open new user dialog box 150 to open, with the privileges level appropriate for the selected sub-node set as default. Furthermore, selection of action control 110 while a name of a user in sub-nodes 84, 86 or 88 is selected may allow the privilege level of the selected user to be changed.

When events node 64 (FIG. 3), or any of events sub-nodes 90-94 is selected, operation of action control 110 may be configured to allow actions related to the definition of events and sending of events notices to be performed. For example, when a particular event type under events definition sub-node 90 is selected, operation of action control 110 may be configured to open a dialog box that allows the configuration of e-mail notification for the selected event to be configured. An example of an event configuration dialog box is shown generally at 160 in FIG. 8. Event configuration dialog box 160 may include an "event type" field 162 that defines the event controlled by dialog box 160. Typically, there is an event type dialog box for each event supported by projector manager 32. In the depicted embodiment, event type field 162 indicates that the event type controlled by event configuration dialog box 160 is a "low lamp life event" that indicates when a preselected remaining (or expired) lamp life threshold has passed. Event configuration dialog box 160 also may include a notification field 164 that allows selection of a user to whom notification of the low lamp life event is to be sent. Notification field 164 may also be configured to allow the e-mail notification feature to be enabled or disabled by the selection of an enablement box 166.

Besides allowing a notification email address to be selected, event configuration dialog box 160 also may include, where appropriate, fields configured to allow event parameters to be set. For example, in the depicted embodiment, event configuration dialog box 160 includes an event parameter field 168 that allows a "remaining lamp life hours" threshold that triggers notification to be set.

As described above, when a new event occurs, the event may be logged into both master event log 92 and new event log 94 (FIG. 3). Selection of the new event in either of these event logs, and then operation of action control 110, may be configured to open an event description dialog box, shown generally at 170 in FIG. 9. Event description dialog box 170 may include an information field 172 that sets forth information regarding the event. Examples of information regarding the event included in information field 172 include, but are not limited to, event type ("low lamp threshold"), the date on which the event occurred, the model number of the projector device on which the event occurred, the location of the projector device on which the event occurred, and a description of the event.

Event description dialog box 170 may also include an event status field 174 that allows new events and old events to be distinguished. New events and old events may be distinguished in any desired manner. In the depicted embodiment, event status field 174 includes a check box 176 (or other suitable mechanism) that signifies whether the event has been handled. The event may remain in new events log 94 until check box 176 is checked by an administrator or user in charge of handling that particular event. After taking care of the event, the administrator or user may put a check in check box 176 indicating that the event has been handled, causing the event to be removed from new events log 94.

Figure 10:
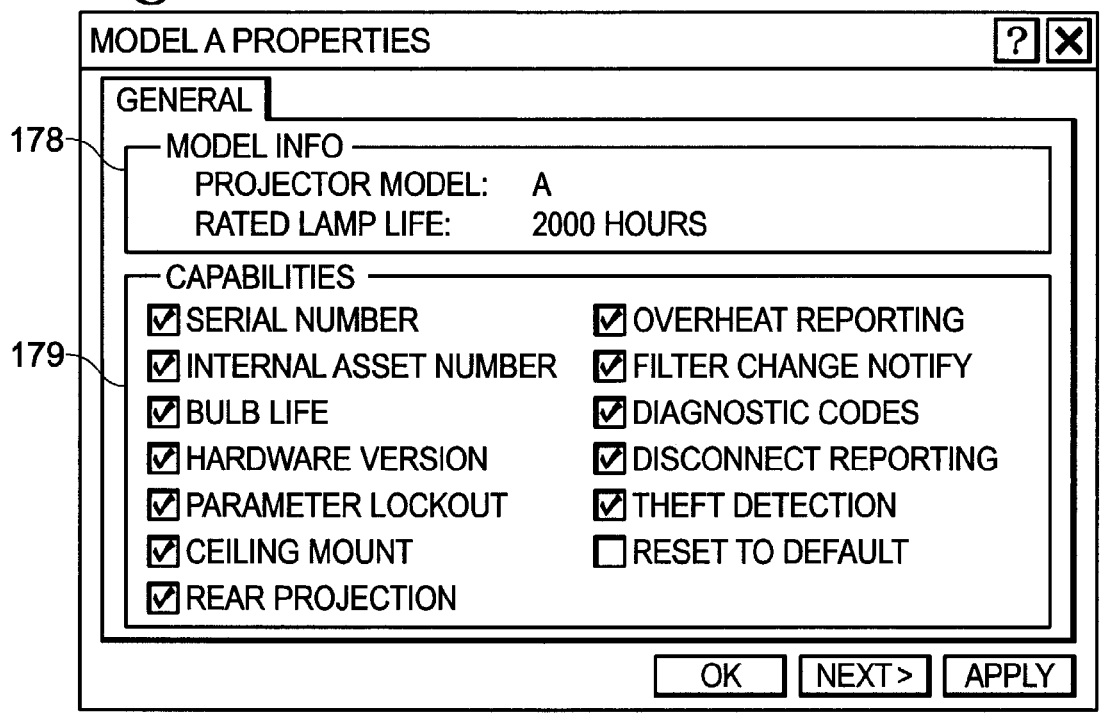
FIG. 10 is a view of an exemplary projector model properties sub-screen of the embodiment of FIG. 3.

When projectors node 66 (FIG. 3), or any of projectors sub-nodes 96–99 is selected, operation of action control 110 may be configured to allow actions related to projector device setup and control to be performed. For example, when projector models node 96 is selected, operation of action control 110 may be configured to allow information related to new projector device models to be imported into projector manager 32, thus permitting compatibility with new projector device models as they arrive. Information regarding the properties and capabilities of a selected projector device model (for example, whether a projector device model can store and/or report a serial number, asset number, bulb life, hardware version, overheating, filter change notify, diagnostic codes, disconnect, theft detection, parameter lockout capabilities/settings, ceiling mount capabilities/settings, rear projection capabilities/settings, etc.) may also be accessed from projector models sub-node 96. This information may be displayed in any suitable format, for example, by a model information dialog box such as that shown generally at 176 in FIG. 10. Model information dialog box 176 may include a general field 178 giving such information as the model name and rated lamp life, and may also include a capabilities field 179 listing the capabilities of the selected projector device.

Figure 11:
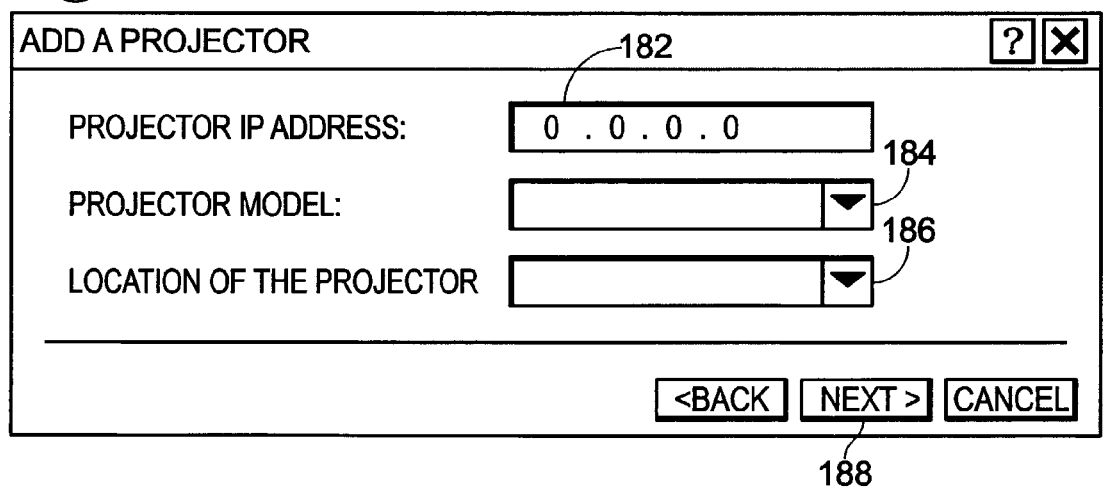
FIG. 11 is a view of an exemplary projector device addition sub-screen of the embodiment of FIG. 3.

Selection of projectors installations sub-node 98 (FIG. 3), combined with operation of action control 110, may be configured to allow new projector devices to be added to database 40 in projector manager 32. New projector devices may be added to database 40 in any suitable manner. One example is shown generally at 180 in FIG. 11 as an "add a projector" dialog box. "Add a projector" dialog box 180 may include an IP address field 182 where a user or administrator with the correct privilege level may enter the network address of the new projector device (or network adapter), a projector model field 184 where the user or administrator may enter the model of the projector device, and a projector location field 186 where the user or administrator may enter the geographical location of the projector device. Any other suitable information in addition to the IP address, projector device model, and projector device location may be entered while adding a new projector device. In the embodiment depicted in FIG. 11, "add a projector" dialog box includes a "next" button 188 that allows a user to open a second dialog box (not shown) to enter information related to a new projector device installation. Examples of further information related to a new projector device installation that may be entered in a second dialog box (not shown) include, but are not limited to, information related to a default shutdown schedule for the new projector device. This information may be entered into a second dialog box (not shown) that is similar to that shown in FIG. 6 for the overall system default shutdown schedule, and may be configured to permit the selected projector device to override the overall system default shutdown schedule.

In some embodiments of the present invention, projector devices 12, 16, and/or network adaptor 18 may be configured to contact locator service 42 automatically upon being connected to system 30. In these embodiments, a projector device being connected to system 30 needs to know only the IP address (or DNS name) and port of the locator service 42 that is responsible for controlling the projector device. In these embodiments, the projector device first creates a socket connection with locator service 42. The projector device then sends locator service 42 a message asking for the IP address and port of the administration service 44 that will administer the projector device. Locator service 42 responds by sending the projector device a message containing this information. The projector device then opens a connection, for example, a socket connection, to administration service 44 and sends the administration service a message to begin polling. This message contains the projector device's IP address and port. If administration service 44 is willing to accept the projector device (the administration service may refuse to poll a projector device, for example, if the device model is not supported by the administration service), the administration service sends an accept message to the projector device that contains a "lease period." The lease period tells the projector device that administration service 44 will poll the projector device before the lease period expires. If administration service 44 fails to poll the projector device before the end of the lease period, the projector device may be configured to try one or more times to restart the polling process. If this fails, the projector device may be configured to go back to locator service 42 and restart the process anew. Once administration service 44 accepts a projector device, it may begin to poll the projector device.

Figure 12:
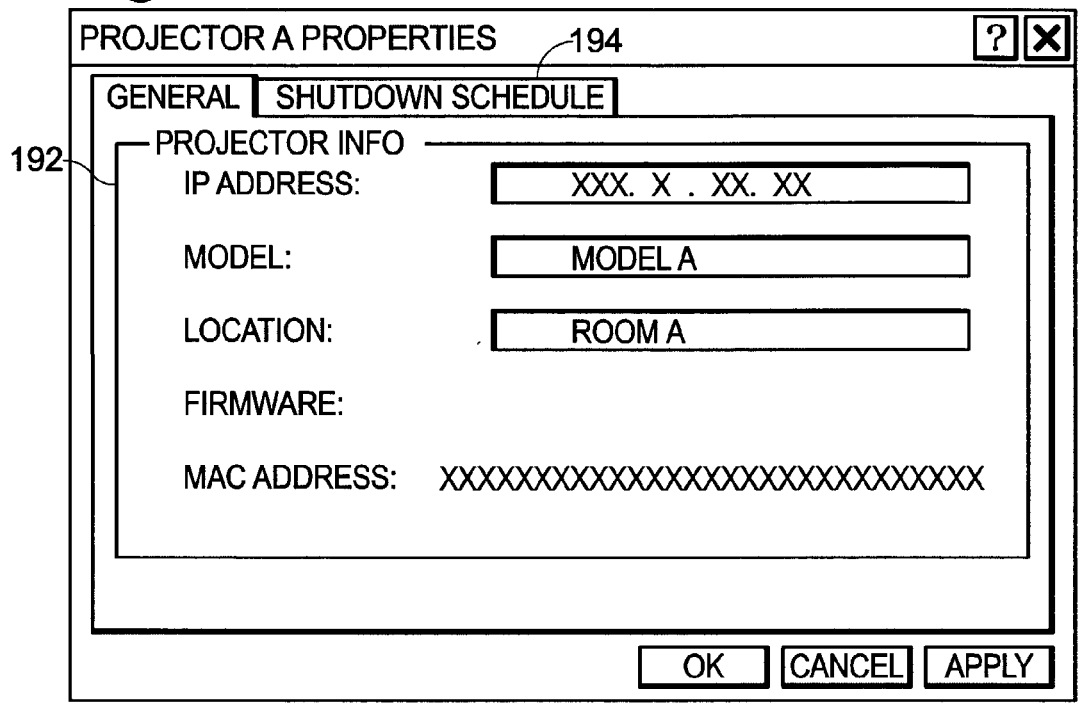
FIG. 12 is a view of an exemplary individual projector device properties sub-screen of the embodiment of FIG. 3.

When installations sub-node 98 is selected in left side window 52 (FIG. 3), projector manager controller 34 may be configured to display a list of projector devices installed on system 30 in right side window 54. Selection of any projector device from the list, followed by operation of action control 110, may be configured to display information related to the selected projector device. Any suitable information regarding the selected projector device may be displayed. One example of information regarding a selected projector device that may be displayed is shown in FIG. 12 as projector information dialog box 190. Projector information dialog box 190 includes a general information sub-dialog box 192 that includes such information as the IP address (or other network address), the model number, the location, the software/firmware version, and the MAC (Media Access Control) address of the selected projector device. Furthermore, projector information dialog box 190 may include other sub-dialog boxes containing other information on the selected projector device, such as a shutdown schedule sub-dialog box, viewable by selection of tab 194 that displays the shutdown schedule of the selected projector device.

Operation of action control 110 while installations sub-node 98 (FIG. 3) is selected may be configured to display projector device status information, and may also be configured to allow the change of various projector device settings. It will be appreciated that many of the functions described below may also be accessed from help desk sub-node 99, where the privilege levels of the functions permit.

Figure 13:
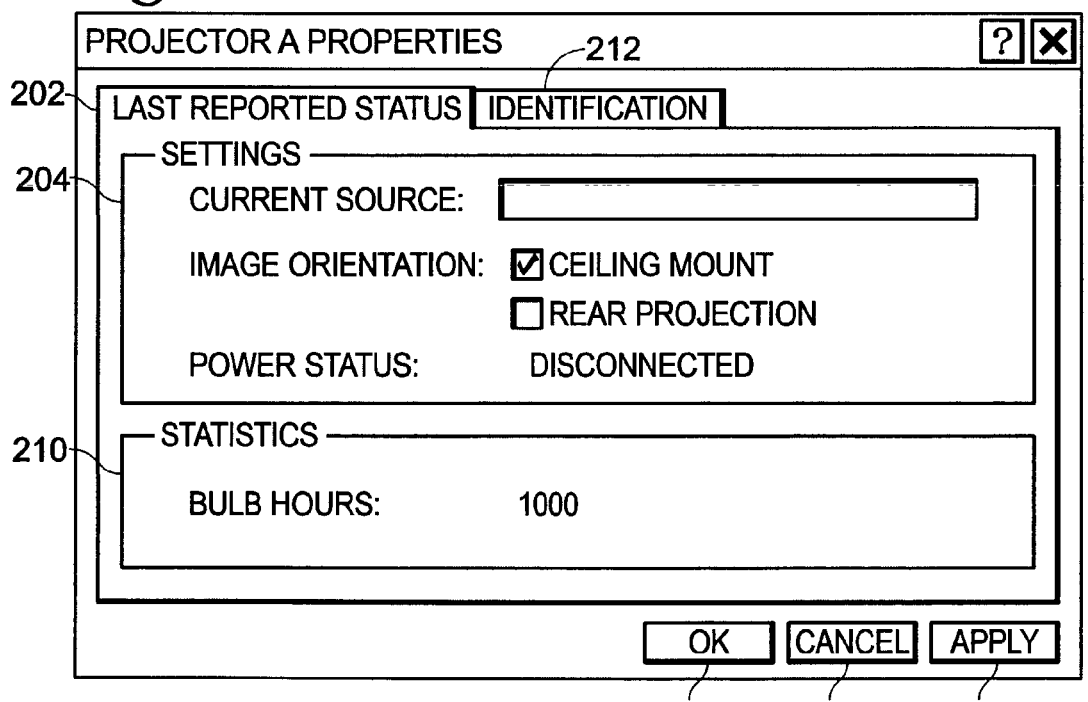
FIG. 13 is a view of an exemplary projector device status sub-screen of the embodiment of FIG. 3.

FIG. 13 shows generally at 200 an example of a projector information and properties dialog box that displays various status information regarding a particular projector device, and also allows a user or administrator to change selected projector device settings. Projector information and properties dialog box 200 includes a last reported status sub-dialog box 202 that sets forth the status of the selected projector device the last time the selected device was polled by projector manager 32. Last-reported status sub-dialog box 202 may include any suitable information about the selected projector device. In the depicted embodiment, last-reported status sub-dialog box 202 includes a user-changeable settings field 204 that sets forth the current image source for the selected projector device, the image orientation, and the power status. These settings may be changed by entering the desired setting in sub-dialog box 202 and then selecting either the "OK" tab 206 (which closes the dialog box) or the "Apply" tab 208 (which leaves the dialog box open). Selection of either of these tabs may be configured to cause projector manager controller 34 to send a message to projector manager 32, directing the projector manager to send a message to the selected projector device to implement the desired status changes. Selection of "Cancel" tab 209 closes the dialog box without sending a message to projector manager 32.

Figure 14:
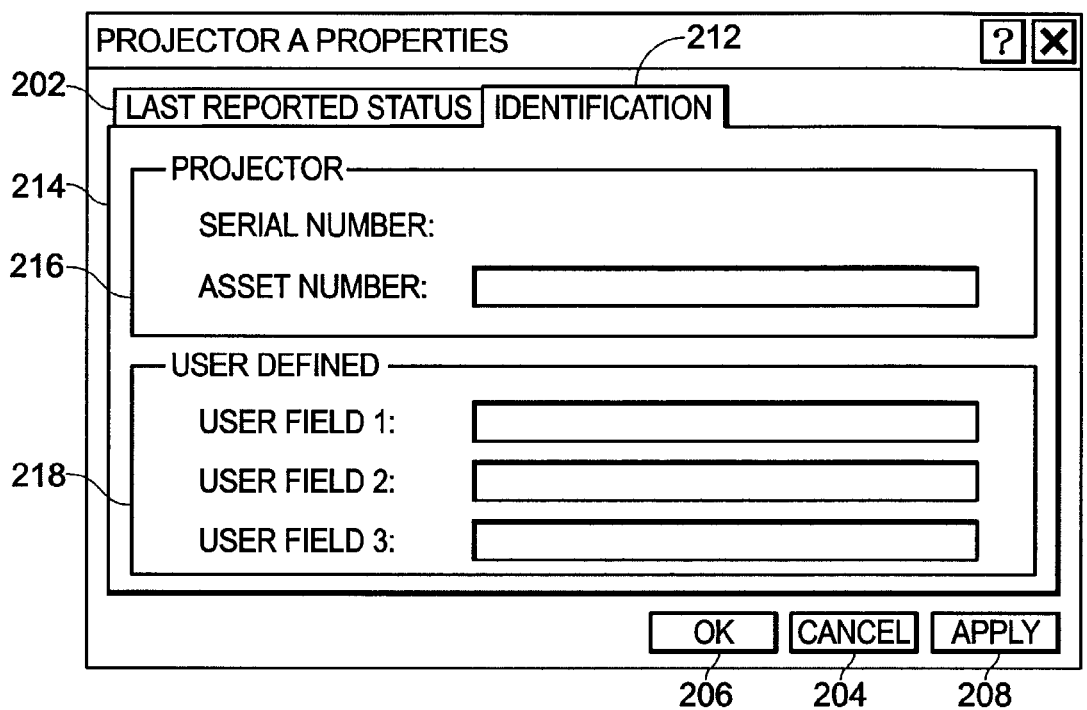
FIG. 14 is a view of an exemplary projector device identification sub-screen of the embodiment of FIG. 3.

Projector information and properties dialog box 200 also may include an identification sub-dialog box 214, which is shown in FIG. 14. Identification sub-dialog box 214 may include a projector field 216 that sets forth the serial number of the selected projector device, and may also include an asset number field so that an administrator can assign an internal asset number to the selected projector device. Identification sub-dialog box 214 may also include a set of user-defined fields 216 that allow a user or administrator to store comments regarding the selected projector device in database 40.

Figure 15:
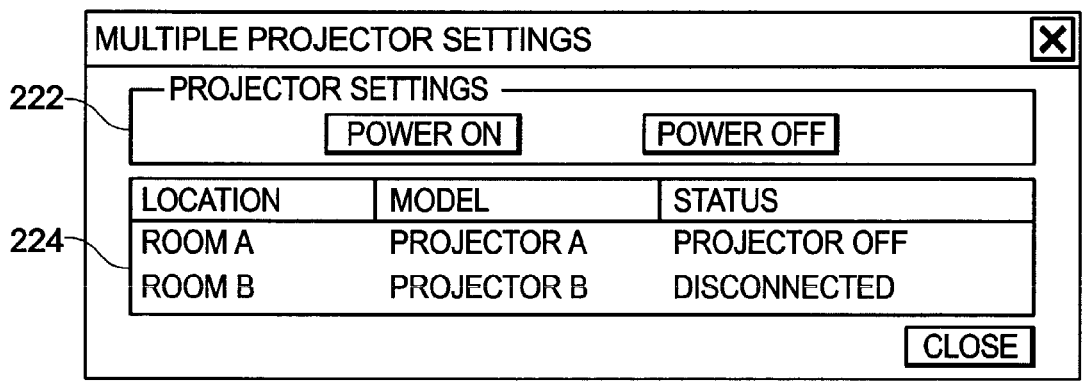
FIG. 15 is a view of an exemplary multiple projector device settings sub-screen of the embodiment of FIG. 3.

Projector manager controller 34 may also be configured to allow settings of a plurality of projector devices to be observed and/or changed at the same time, for example, by selecting multiple projector devices from installations sub-node 98 (FIG. 3), and then operating action control 110. FIG. 15 shows generally at 220 an example of a multiple projector settings dialog box. Multiple projector settings dialog box 220 may include a settings field 222 that allows a selected setting to be changed simultaneously for each of the plurality of projector devices. In the depicted embodiment, "power on" and "power off" controls appear in settings field 222, but any other suitable control may also be included in the settings field. Multiple projector settings dialogue box 220 also may include a projectors field 224 that lists each of the selected projector devices to be affected by operation of the control in settings field 222.

Figure 16:
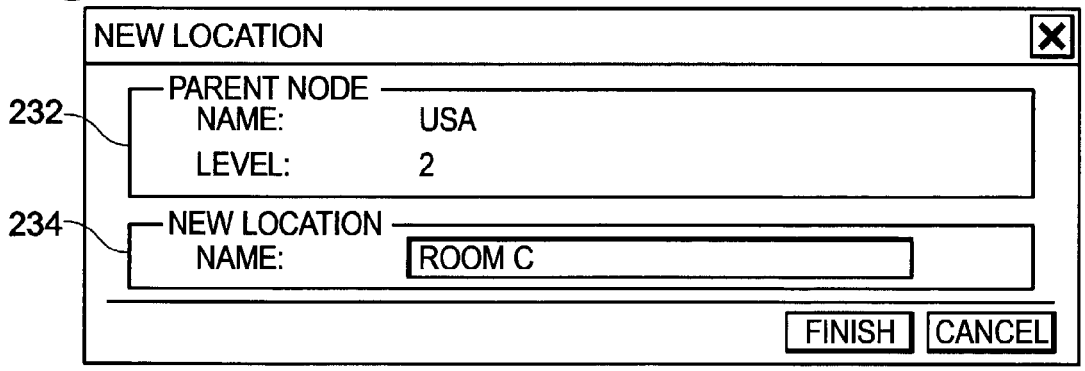
FIG. 16 is a view of an exemplary new location addition sub-screen of the embodiment of FIG. 3.

Operation of action control 110 while directory node 68 (FIG. 3) is selected may be configured to allow a user to add new sub-locations to directory node 68, and thus customize the structure of location nodes underneath directory node 68 to match the geographical, corporate or other structure of the user's entity. FIG. 16 shows generally at 230 an example of a new location dialog box that allows a new location to be added to directory node 68. New location dialog box 230 includes a parent node field 232 that shows the sub-node of directory node in which the new location is to be created. Typically, a user selects the sub-node in which the new location is to be created by selecting the desired sub-node in left side window 52 of user interface 50, but parent node field 232 may also be configured to accept the manual entry of a parent node for the new location if desired. New location dialog box 230 also includes a new location name field 234 that allows the user to assign a name to the new location. Once the name of the new location has been entered, selecting finish button 236 creates the new location.

The commands and queries described above each involve communication between projector manager controller 34, projector manager 32, and projector devices 12, 16 and/or network adaptor 18. Projector manager controller 34 and projector manager 32 may be configured to communicate in any desired manner. One suitable manner of communication follows the general steps shown generally at 300 in FIG. 17. Communication method 300 includes first accepting input, at 302, from a user at projector manager controller 34. Projector manager controller then sends, at 304, a first message to projector manager 32. The first message is configured to direct projector manager 32 to send a selected query or command to a selected projector device. Next, projector manager 32 receives, at 306, the first message, and then sends, at 308, a second message to the projector device. The second message is configured to query the projector device of its current state, to command the projector device to change its current state, and/or other such functions related to the management and control of the projector device.

The user input may be accepted at the projector manager controller in any suitable manner. Examples of suitable methods of accepting user input at the projector manager controller include, but are not limited to, the use of a graphical user interface that utilizes dialog boxes into which the user may enter commands, or an active web page on which a user may enter commands. Projector manager controller 34 typically sends the first message to administration service 44, though it may send it to another service if desired.

In some embodiments of the invention, projector devices 12, 16 and/or network adaptor 18 may not be able to accept more than one connection at a time. Thus, in these embodiments, administration service 44 may first remove the selected projector device from its polling loop before sending the second message to the selected projector device. This may be accomplished by waiting until the completion of a polling thread, and then opening a socket connection to the selected projector device before another polling thread is started.

The first and second messages may have any suitable format. For example, the second message may be sent as a PCML command or query, as described above. Likewise, in some embodiments of the present invention, the first message is a binary message that is transmitted through a TCP/IP socket that is opened by projector manager controller 34 when the projector manager controller connects to projector manager 32. One suitable message format is shown generally at 310 in FIG. 18. Message 310 includes three sections or elements: a message header 312, a message results section 314, and a message body 315. Message body 315 may include a fixed portion 316 and a variable portion 318, as described in more detail below.

Message header 312 may contain one or more fields that describe the overall message. For example, in the depicted embodiment, message header 312 contains a field for the message length 320. Message length field may give the total size of the message, and is useful for reading messages by the receiving party. The message length field may be read first, which allows messages to be sent that span multiple TCP/IP packets, as well as situations where two or more messages are sent as part of the same TCP/IP packet.

Message header 312 may also contain a field for the message type 322. Message type field 322 may be used to identify the type of the message via a numerical field that matches a pre-defined message type that is stored within projector manager 32 and/or projector manager controller.

Message header 312 also may contain a field for the message ID 324. Message ID field 324 may contain a sequential number assigned to the packet upon transmittal. This number may allow a packet to be re-transmitted upon error, and also allow messages and responses to be matched up if necessary. Message header 312 also may contain a message version field 326, which may indicate the version of the header file that the message was generated against. Additionally, message results section 314 of message 310 may include a code indicating whether a message is a response to a query or command.

Fixed portion 316 of message body 315 may contain a set of fields specific to the message being sent. This may be implemented as a structure for each message type, and all of the structures may then be merged to form fixed portion 316. Examples of fields that may be included in fixed portion 316 include, but are not limited to, logon information, user type, user rights, a variable portion offset field, and a variable portion length field. The variable portion offset field may contain a value corresponding to the offset from the beginning of the message body to the start of the variable field, while the variable portion length field may contain the total length of the variable field, to help the message receiver determine the starting position variable portion 318 of message body 315.

Variable portion 318 of message body 315 contains the actual content of the message. For example, where message 310 is sent to log a user onto system 30, the letters in the user's name are contained within variable portion 318.

Figure 19:
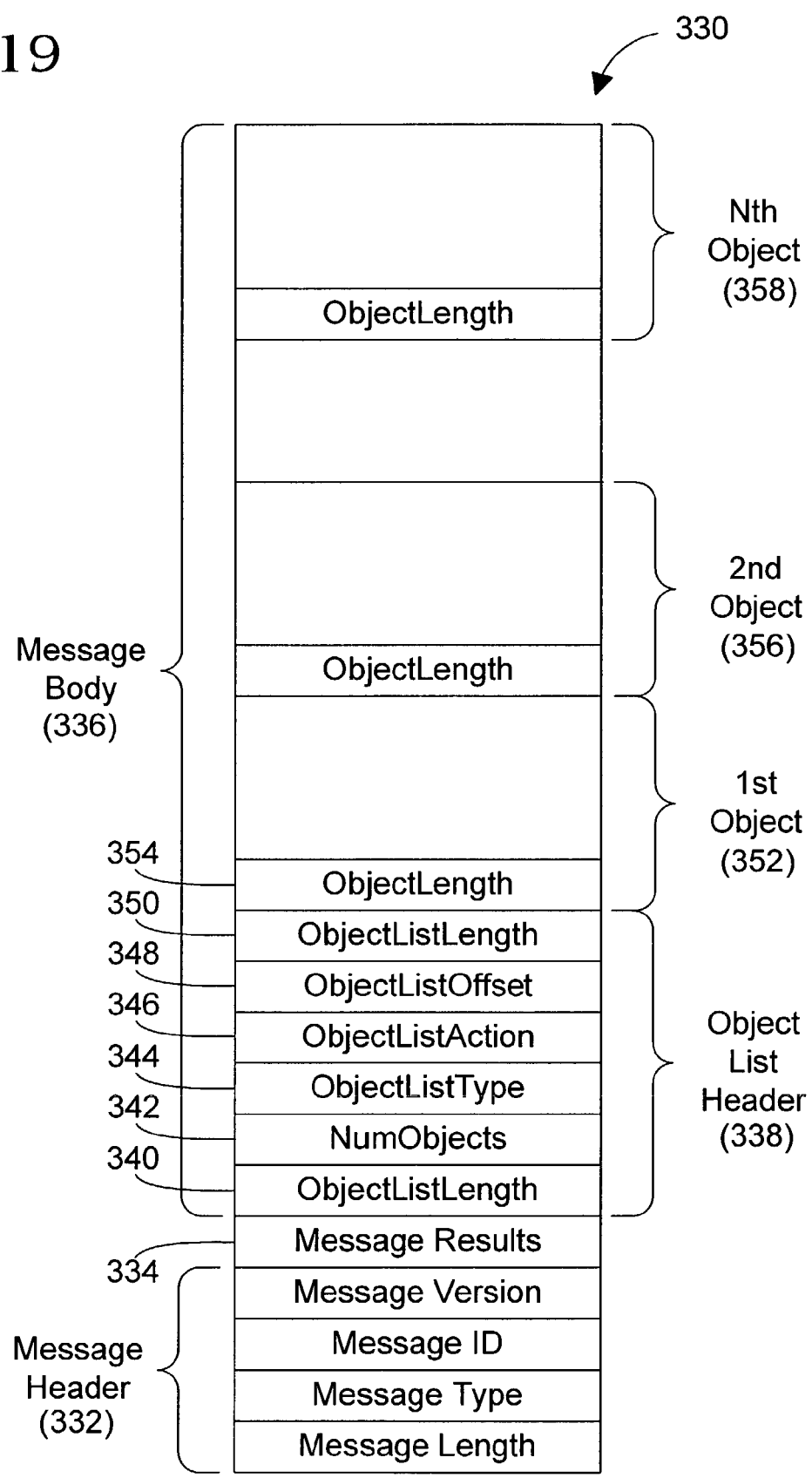
FIG. 19 is a block diagram of a second exemplary message format suitable for use with the embodiment of FIG. 17.

As described above, some messages may include commands to be performed on more than one projector device, or may include more than one command to be performed on a selected projector device. In these situations, the message sent at 302 may have a different format than that of message 310. FIG. 19 shows generally at 330 an example of a suitable message format for sending multiple commands and/or queries (collectively referred to as objects) in a single message. Message 330 includes a message header 332 similar to that described above for message 310, a message results section 334 for returning the results of the message, and a message body 336. However, message body 336 is formatted as an object list. Thus, message body may include an object list header 338 that contains such information as the object list length 340, the number of objects contained within object list 342, and the object list type 344, which contains information regarding the type of objects contained within message 330.

Object list header 338 may include an object list offset field 348 and an object list length field 350 to help calculate the location of the start of first object 352. Likewise first object 352 may include an object length header 354 that gives the length of the first object. Thus, first object length header 354 can be used to calculate the starting location of second object 356. Second object 356 itself has a header that may allow the starting location of the next object to be selected. Thus, the starting location of each nth object 358 can be calculated from the header of the prior object.

Object list header 338 also may include an object list action section 346, which may indicate what type of action is to be performed on the object list. Examples of actions that may be performed include query, add, delete, and update. For example, when a user enters a request at projector manager controller 34 to get a list of current users and their privilege levels, object list action section 346 may indicate that the action is a query. Likewise, where a user enters a list of names to be added or removed from a users list, or a list of names for which the privilege level is to be changed, object list action section may indicate that the action is an add, delete, or update action, respectively. Each name in the list is typically included in message 330 as a separate object.

Projector manager 32 may be configured to acknowledge each message that originates at projector manager controller 34 with a response message. The message/response pair may fall into either of two categories based upon the direction of information flow. When information is transferred from projector manager 32 to projector manager controller 34, the transaction may be referred to as a query/response transaction. Likewise, when information is transferred from projector manager controller 34 to projector manager 32, the transaction may be referred to as a command/response transaction.

Figure 20:
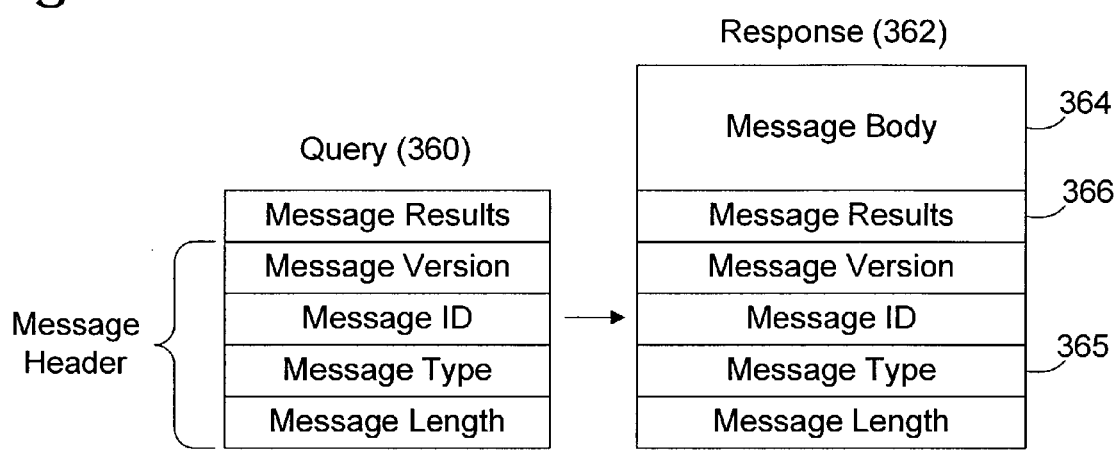
FIG. 20 is a block diagram of an example query/response transaction according to the embodiment of FIG. 17.
Figure 21:
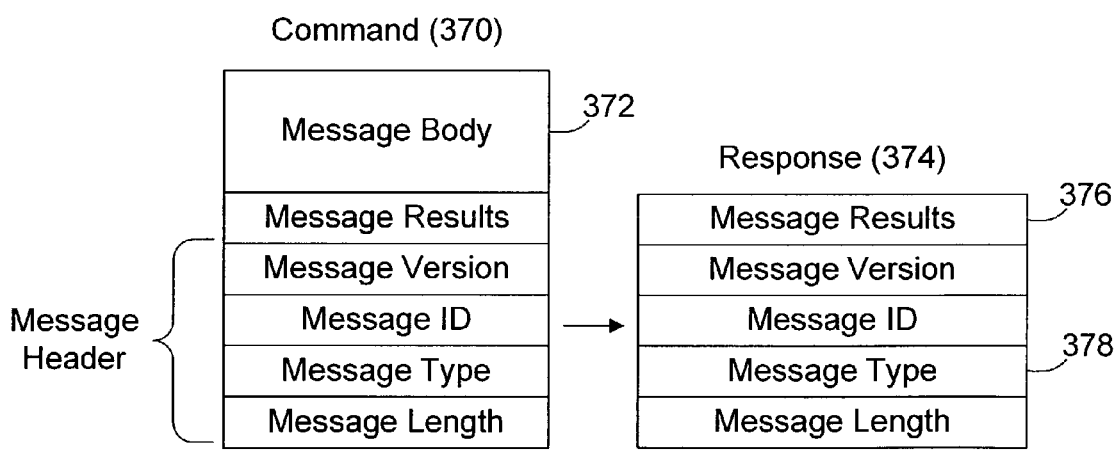
FIG. 21 is a block diagram of an example command/response transaction according to the embodiment of FIG. 17.

FIG. 20 shows a block diagram of an exemplary query/response transaction, and FIG. 21 shows a block diagram of an exemplary command/response transaction. Referring first to FIG. 20, query 360 has the format of message 310. Because no information is transferred in query 360, the query contains no message body. However, response 362 to query 360 does include a message body, indicated at 364, as information is being returned in response to the query. Also, message type section 365 may include an indication that the message is a response message. Furthermore, message results section, indicated at 366, may include a results code to indicate that the message is a response, in addition to the results of the query.

FIG. 21 shows a block diagram of a command/response message transaction. Because information is being sent to projector manager 32 in command 370, the command includes a message body 372 containing information relevant to the command. However, response 374 to command 370 includes no message body, as no information is returned in the response. As with response 362 of FIG. 20, response 374 may include a message type section 376 that is set to indicate that the message is a response, and also may include a message results section 378 that indicates the results of the command.

Figure 22:
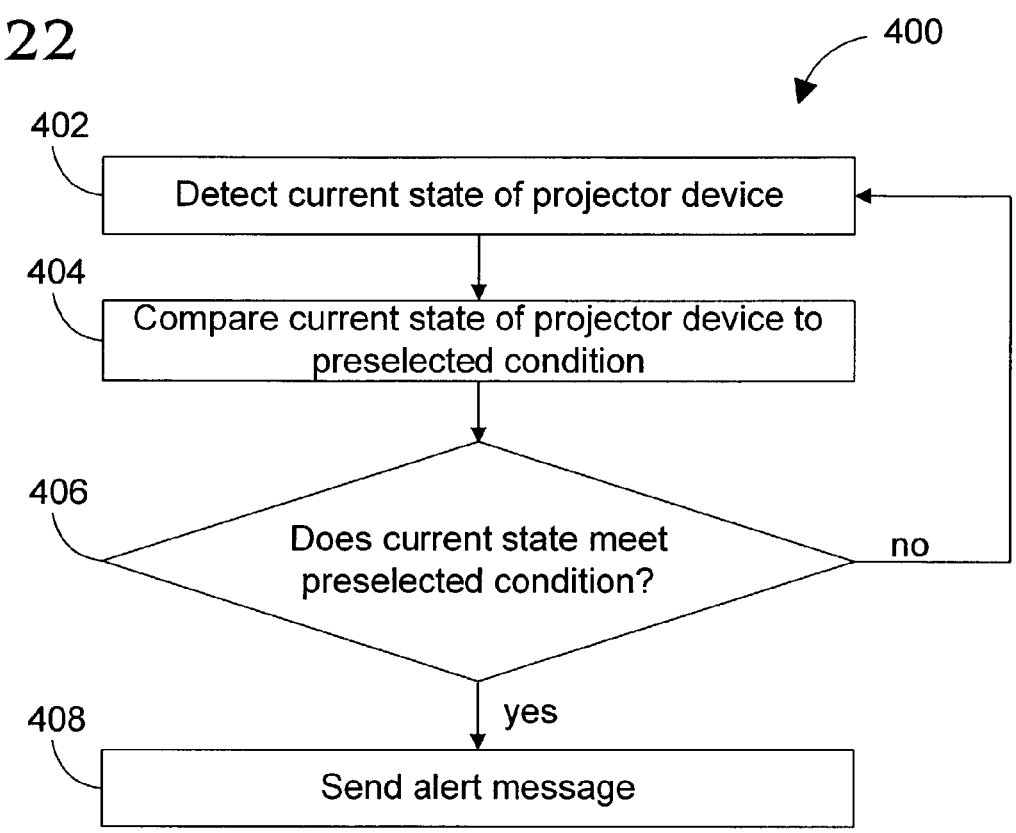
FIG. 22 is a flow diagram of a method of automatically alerting of a changed state of a projector device according to another embodiment of the present invention.

As described above, projector manager 32 may be configured to detect events that occur to projector devices 12, 16, and to alert a selected user or administrator via e-mail (or other suitable method) when an event occurs. FIG. 22 shows generally at 400 a flow diagram depicting the general steps involved in monitoring a selected projector device 12, 16 for an event. First, projector manager 32 detects the current state of the projector device at 402. Detecting the current state of the projector device is typically performed by querying the projector device for the current state of a selected projector function or feature. Examples of suitable functions or features to detect include, but are not limited to the remaining lamp life, whether power to the projector device is on or off, whether the projector device is connected or disconnected to the network, whether the cooling fan is clogged, and other similar features and/or functions.

After detecting the current state of the projector device at 402, the current state returned by the projector device is compared to a preselected condition at 404 to see if the current state meets the preselected condition. The preselected condition may correspond to any suitable state or value for the selected feature or function. For example, where the current number of remaining lamp hours is detected at 402, the preselected condition may correspond to a threshold number of remaining hours. Likewise, where the operability of the cooling fan of a selected projector device is detected at 402, the preselected condition may correspond to a state in which the fan is not operating properly, or where the temperature of the projector device exceeds a threshold temperature.

If comparison of the current state of the projector device and the preselected condition at 406 shows that the current state does not meet the condition, then the current state of the projector device is again polled at 402. However, if the current state of the projector device is determined to meet the preselected condition, an event has occurred. In this case, projector manager 32 sends an alert message at 408 to the user or administrator designated to receive alerts corresponding to the particular event, and the event may be recorded in new event log 94.

While various alternative embodiments and arrangements for a projector device management system have been shown and described above, it will be appreciated by those skilled in the art that numerous other embodiments, arrangements and modifications are possible and are within the scope of the invention. Thus, although the present invention has been disclosed in specific embodiments thereof, the specific embodiments are not to be considered in a limiting sense, because numerous variations are possible. The subject matter of the invention includes all novel and nonobvious combinations and subcombinations of the various elements, features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the invention of the present disclosure.

We claim:

1. A system for managing a plurality of distributed projector devices over a computer network, the system comprising:
   a projector manager linked to the computer network and adapted to manage each of the plurality of distributed projector devices from a common location, wherein the projector manager is configured to monitor over the network a hardware status of a selected feature by periodically polling a selected one of the plurality of distributed projector devices and to change via the network the hardware status of the selected feature when requested; and
   a projector manager controller linked to the computer network, wherein the projector manager controller is configured to request the projector manager to perform at least one of the functions of reporting the hardware status of the selected feature and requesting the selected remotely-located projector device to change the hardware status of the selected feature;
   wherein the projector manager is configured to send an alert message to another network device when a change in hardware status is detected, and wherein the projector manager includes a locator service configured to serve as a reference point for communication with other network components and to determine locations of other services when access to other services is requested by another network device, the locator service being configured to manage a list of registered users for the system and to control system logon functions, wherein a privilege level is stored for each registered user.

2. The system of claim 1, wherein the projector manager is configured to store the current hardware status of the selected feature after polling the selected projector device.

3. The system of claim 1, wherein the selected feature is selected from the group consisting of a power on/off status, a current image source, ceiling mounted status, table mounted status, rear projection mode status, remaining lamp hours, network connectivity status, cooling fan status, projector device temperature, projector device model name, projector device firmware revision number, and projector device serial number.

4. The system of claim 1, wherein the projector manager includes at least one service configured to interact with the projector manager controller to perform tasks requested by the projector manager controller and to provide information requested by the projector manager controller to the projector manager controller.

5. The system of claim 4, wherein the projector manager includes a locator service configured to serve as a single system reference point for communication with other network components, and to determine locations of other services when access to other services is requested by another network devices.

6. The system of claim 5, wherein the locator service is configured to manage a list of registered users for the system and to control system logon functions.

7. The system of claim 6, wherein the locator service is configured to store a privilege level for each registered user.

8. The system of claim 4, wherein the administration service is configured to set projector device parameters when directed by the projection manager controller.

9. The system of claim 4, wherein the administration service is configured to monitor the projector devices for changes in projector device hardware status.

10. The system of claim 9, wherein the administration service is configured to send an alert message to a selected network device when a change in projector device hardware status is detected.

11. The system of claim 9, wherein the administration service is configured to maintain a log of detected changes in projector device hardware status.

12. The system of claim 11, wherein the log of detected changes in projector device hardware status includes a new events log configured to store detected changes in projector device hardware status that have not been attended to by an adminstrator.

13. The system of claim 4, further comprising a plurality of administration services located at a plurality of different network locations, and a locator service configured to apportion administrative tasks of the administration servers among the plurality of projector devices.

14. The system of claim 4, wherein the projector manager includes a directory service configured to keep track of physical locations of the plurality of projector devices.

15. The system of claim 4, wherein the projector manager includes a telnet service configured to communicate with telnet-enabled projector devices.

16. The system of claim 4, wherein the projector manager controller is configured to connect to each service via a separate socket connection.

17. The system of claim 1, wherein the projector manager includes at least one translator for translating commands and queries from the projector manager to the selected projector device into a command language utilized by the selected projector device.

18. The system of claim 1, wherein the projector manager includes a database configured to store information related to projector devices.

19. The system of claim 18, wherein the information related to projector devices includes information related to the hardware status of the selected projector device.

20. The system of claim 18, wherein the information related to projector devices includes information regarding capabilities of selected projector device models.

21. The system of claim 1, wherein the projector manager is implemented at least partially by software executable on a server computing device.

22. The system of claim 1, wherein the projector manager controller is implemented at least partially by software executable on a client computer device.

23. The system of claim 1, further comprising a network adaptor disposed between the selected projector device and the projector manager to enable communications between the selected projector device and the projector manager.

24. The system of claim 1, wherein the projector manager controller is configured to accept input from a user directing the projector manager controller to communicate with the projector manager.

25. The system of claim 1, wherein the projector manager controller includes a user interface configured to present hardware status information to a user upon request by a user.

26. A system for administrating a plurality of distributed network-enabled projector devices over a computer network, the system comprising:
server software adapted to manage each of the plurality of distributed network-enabled projector devices from a common location, the server software being stored on a recordable medium linked to the network, wherein the server software is executable by a server computing device to communicate, from a common location aver the network, with any remotely-located projector device selected from the plurality of network-enabled projector devices to detect a hardware status of the selected projector device by periodically polling the selected projector device and to change the hardware status of the selected projector device when directed, wherein the server software is configured to send an alert message to another network device when a change in hardware status is detected, wherein the server software includes a locator service configured to serve as a reference point for communication with other network components and to determine locations of other services when access to other services is requested by another network device, the locator service being configured to manage a list of registered users for the system and to control system logon functions, wherein a privilege level is stored for each registered user; and
administrative client software stored on a recordable medium linked to the network, wherein the administrative client software is executable by a client computing device to permit a user to direct the server computing device to communicate with the selected projector device.

27. An article comprising:
one or more storage media including instructions executable by a client computing device and a common server computing device linked to a computer network to control a plurality of distributed projector devices over the network, the common server computing device including a locator service configured to serve as a reference point for communication with other network components and to determine locations of other services when access to other services is requested by another network device, the locator service being configured to manage a list of registered users for the system and to control system logon functions, wherein a privilege level is stored for each registered user, wherein, when selected, each of the plurality of distributed projector devices is controlled at least by:
accepting an input from a user at the client computing device, wherein the input includes instructions directing the server computing device to periodically request the projector device to send hardware status information to the server computing device, and wherein the input requests a selected function to be performed on the selected one of the plurality of distributed projector devices;
sending a first message from the client computing device to the common server computing device directing the common server computing device to request the selected one of the plurality of distributed projector devices to perform the selected function;

upon receiving the first message at the common server computing device, sending a second message from the common server computing device to the selected one of the plurality of distributed projector devices requesting the projector device to perform the selected function; and upon detecting a change in hardware status based on performing the selected function, sending a third message from the common server computing device to another network device to alert the network device of the change in hardware status.

28. The article of claim 27, wherein the hardware status information is selected from the group consisting of a power on/off status, a current image source, ceiling mounted status, table mounted status, rear projection mode status, remaining lamp hours, network connectivity status, cooling fan status, projector device temperature, projector device model name, projector device firmware revision number, and projector device serial number.

29. The article of claim 28, wherein the preselected condition is the projector device being disconnected from the network.

30. The article of claim 27, wherein the input includes instructions directing the server computing device to compare the hardware status of the projector device to a preselected condition, and to send an alert message to the client computing device if the hardware status of the projector device meets the preselected condition.

31. The article of claim 30, wherein the preselected condition is a low-lamp-life condition.

32. The article of claim 27, wherein the input includes instructions directing the server computing device to change a hardware status of the projector device.

33. The article of claim 32, wherein the hardware status of the projector device is selected from the group consisting of power on/off status, a current image source, ceiling mounted status, table mounted status, and rear projection mode status.

34. The article of claim 27, wherein the input includes instructions directing the server computing device to shut down the projector device according to a preselected schedule.

35. A method for remotely controlling a plurality of distributed network-enabled projector devices, wherein each of the plurality of distributed network-enabled projector devices is connected to a computer network that includes a client computing device and a server computing device adapted to manage each of the plurality of distributed network-enabled projector devices from a common location, the server computing device including a locator service configured to serve as a reference point for communication with other network components and to determine locations of other services when access to other services is requested by another network device, the locator service being configured to manage a list of registered users for the system and to control system logon functions, wherein a privilege level is stored for each registered user, the method comprising:

sending a first message from the client computing device to the server computing device directing the server computing device to request a selected one of the plurality of distributed projector devices to perform a selected hardware function;

upon receiving the first message at the server computing device, sending a second message from the server computing device to the selected one of the plurality of distributed projector devices requesting the projector device to perform the selected hardware function; and upon detecting a change in hardware status based on performing the selected function, sending a third message from the common server computing device to another network device to alert the network device of the change in hardware status.

* * * * *